United States Patent [19]

Dayan et al.

[11] Patent Number: 5,504,904

[45] Date of Patent: Apr. 2, 1996

[54] PERSONAL COMPUTER HAVING OPERATING SYSTEM DEFINITION FILE FOR CONFIGURING COMPUTER SYSTEM

[75] Inventors: Richard A. Dayan; Palmer E. Newman, both of Boca Raton, Fla.

[73] Assignee: International Business Machines Corporation, Armonk, N.Y.

[21] Appl. No.: 200,790

[22] Filed: Feb. 23, 1994

[51] Int. Cl.⁶ .................................................. G06F 9/00
[52] U.S. Cl. ................................. 395/700; 364/DIG. 1; 364/280; 364/280.2; 364/280.3
[58] Field of Search ..................................... 395/650, 700

[56] References Cited

U.S. PATENT DOCUMENTS

| | | | |
|---|---|---|---|
| 4,736,318 | 4/1988 | Delyani et al. | 364/200 |
| 4,908,750 | 3/1990 | Jablow | 364/200 |
| 4,974,151 | 11/1990 | Advani et al. | 364/200 |
| 5,012,409 | 4/1991 | Fletcher et al. | 364/200 |
| 5,057,997 | 10/1991 | Chang et al. | 364/200 |
| 5,128,995 | 7/1992 | Arnold et al. | 380/4 |
| 5,220,654 | 6/1993 | Benson et al. | 395/275 |
| 5,253,344 | 10/1993 | Bostick et al. | 395/275 |
| 5,257,368 | 10/1993 | Benson et al. | 395/600 |
| 5,257,379 | 10/1993 | Cwiakala et al. | 395/700 |
| 5,363,497 | 11/1994 | Baker et al. | 395/425 |
| 5,369,749 | 11/1994 | Baker et al. | 395/325 |

OTHER PUBLICATIONS

R. Dayan, "Memory Address Space", IBM Personal Systems Technical Solutions Oct. 1992, pp. 21–26.

*Primary Examiner*—Kevin A. Kriess
*Attorney, Agent, or Firm*—R. S. Babayi

[57] ABSTRACT

An operating system definition file (ODF) is provided for each operating system stored in a computer system. Each ODF contains a list of keywords that define the operating environment for the particular operating system. During setup, a set configuration program reads each ODF and produces a master record that specifies an ordering of non-system memory regions across all of the operating systems that coexist in the computer system, allowing non-system memory allocations to be made to regions that meet all operating system needs. A merge matrix is used to merge records from the ODFs into a common array allowing the records to be searched to find optimum non-system memory allocations. A memory address space topology table is also built by the set configuration program for use by the operating system during initialization and during allocation of memory.

22 Claims, 23 Drawing Sheets

*** SYSTEM CONFIGURATION DEPENDENT

PERSONAL COMPUTER HAVING OPERATING SYSTEM DEFINITION FILE FOR CONFIGURING COMPUTER SYSTEM

BACKGROUND OF THE INVENTION

1. Field of the Invention

This invention relates to the field of data processing, and, more particularly, to an improved method and apparatus that allows an operating system to participate in the process of setting the configuring of the system, through use of an operating system definition file.

2. Description of Related Art

IBM PS/2 personal computers are based on the 80xxx family of microprocessors that operate bimodally in real and protected modes. In accordance with PS/2 architecture, various hardware devices are connected into the system by adapters having a Programmable Option Select (POS) function used to define or provide settings for the assignment of system resources to the system board and to various adapters. The POS Function is generally described in "IBM Personal System/2 Hardware Interface Technical Reference", First Edition (May 1988) and updates, published by International Business Machines Corporation, to which reference may be had for a more detailed description thereof.

Adapters provide the means by which various data processing system devices and options can be connected into and operated as part of a personal computer system. In accordance with the above mentioned architecture, an adapter has a group of programmable registers which, by convention, store predetermined information. Two of these registers store an adapter ID that uniquely identifies the specific adapter relative to other adapters. From one to four additional registers, known as the POS registers, store information known as the POS settings. Before an adapter can be used, an adapter description file (ADF) must be created by the supplier of the adapter. The ADF contains data necessary for the operation of the adapter and its related option or device, the data defining the resources the adapter can use, and the associated POS register settings that indicate the resources assigned.

An ADF contains various fields of information including the following: adapter ID; adapter name; the number of POS registers to be included; an optional field indicating that an adapter option will be specified next; a prompt keyword; a choice keyword including the choice name, a POS setting which programs the adapter appropriately, and a resource setting which identifies the resources used for the particular choice; and a help keyword.

A Set Configuration Program, found on a PS/2 System Reference Diskette or a PS/2 System Reference Diskette Image in the System Partition in a protected partition on the hardfile, gathers information from the hardware system and resident adapters from special data files. These special files associated with adapters are the ADFs. The PS/2 Micro Channel System also has associated special files. They are called planar description file and system ADF. Another file associated with either planar or adapter is the Adapter Description Program or ADP. An ADP allows the associated adapter to use programming logic during the configuration process to make dynamic decisions based on the configuration of the system.

The set configuration program is run when the system is initially setup and when the system indicates a configuration error. This program assigns system resources, particularly those portions of the memory address space assigned to system memory and to non-system memory, and resolves any resource request conflicts between ADFs. The execution of the program stores configuration information in a non-volatile random access memory (NVRAM). Thereafter, whenever the system is started up or reset, this configuration information is accessed for testing whether a configuration change has occurred, programming the adapter's POS registers, providing information to the operating system indicating what resources are assigned to the various devices, and operating such devices.

At this point, it is helpful to define what is meant by "memory address space", "system memory", "non-system memory", and "memory regions". These terms have arisen as a result of the evolution of microprocessors and operating systems, and particularly the availability of larger address spaces due to increases in the number of address bits used with different microprocessors. A fuller discussion is made by Rick Dayan, "Memory Address Space", IBM Personal Systems Technical Solutions, October 1992, Pages 21–26, which is incorporated herein by reference. Briefly, "memory address space" is defined to be the maximum number of address locations accessible with a given number of address bits. Microprocessors used in IBM personal computers have evolved using 20-bit, 24-bit, and 32-bit addressing, which respectively provide memory address spaces of 1 MB (megabyte), 16 MB, and 4 GB (gigabyte).

FIG. 9 is similar to FIG. 4 of the above identified article by R. Dayan, and illustrates a four GB memory address space 600 of an 80386 DX processor having 32-bit memory addressing. The memory address space is occupied by both system memory and non-system memory. "System" memory is that part of the memory address space that is owned, managed, and allocated by the operating system. System memory is used for the storage of operating system code, application code, and data. "Non-system" memory is any portion of the memory address space that is available for exclusive use by either a feature adapter and/or a software program such as a device driver. Non-system memory is not owned by the operating system and the operating system cannot store programs or data therein. Non-system memory commonly is dedicated to interfacing with feature adapters and provide programming interfaces, device control and data buffers. System memory uses only read/write memory technology, typically RAM, while non-system memory uses not only read/write technology but other memory technologies such ROM, flash memory, NVRAM, etc. During configuration of the memory address space, allocation of non-system memory takes precedence over allocation of system memory. Relative to RAM, system memory is allocated whatever portion of RAM that is not allocated to the non-system memory.

The term "memory regions" refers to the original memory address space for 20-bit addressing, and to the added spaces resulting from 24-bit and 32-bit addressing. Memory region 1 starts at address OH (hex) and is the lowest 1 MB address space. The system memory occupies the lowest 640 KB of region 1 and non-system memory is allocated, to maintain compatibility with a DOS environment. Memory region 2 is from 1 MB to (16 MB–1), and memory region 3 is from 16 MB to (4 GB–1). Within a region, system memory must be contiguous and start at the lowest address. Non-system memory need not be contiguous in a region. The manner in which the address space is managed varies, particularly as to size and location of non-system memory, dependent on which regions are supported by an operating system. The size of the address space between the system memory and the non-system memory in region 2 and 3 depends upon how much RAM memory is installed in the system.

While PS/2 computers run under different operating systems, such as the commercially available PC/DOS (disk operating system), AIX/PS/2, and OS/2 operating systems, the hardware has been developed independently of any particular operating system. (PS/2, AIX/PS/2 and OS/2 are trademarks of International Business Machines Corporation) The above configuration process is also independent of the operating system environment. However, such independence leads to limitations in the configuration process.

Since the configuration process is independent of the operating environment, the configuration program assumes a default one megabyte (1 MB) PC/DOS operating environment in most cases. This means that system configuration is optimized for a restrictive and old operating environment. Users choosing contemporary operating system environments such as OS/2, AIX/OS/2, or other multitasking operating systems, are constrained to the PC/DOS optimized environment. Thus, a device may not be successfully configured or it may incur a performance degradation due to non-optimal configuration for the contemporary operating systems. Without operating system input, the set configuration program cannot make the correct decisions on how to customize the configuration.

Two possible solutions to this problem are (1) manual configuration and (2) operating system configuration. Manual configuration is really not an answer. This requires the customer to completely understand the operating environment and the individual options (parameters) for each adapter or device. Most of the adapters do not publish all the parametric information, nor explain its impact on the operating environment. Most users would be confused and probably not make the appropriate decisions to produce an optimal configuration for the operating environment.

An operating system performing the configuration is the ideal solution. What else could better define the optimal configuration for the environment created by the operating system? However, in the PS/2 and personal computer industry, none of the operating systems currently perform system configuration. It may be a long time before operating system configuration occurs, and, if it does, probably not all the operating systems will migrate to performing their own configuration. In addition, Multiboot, a product that enables more than one operating system to be booted in a system, creates a problem with allowing the operating system to configure the system. The problem is that all operating environments utilized on the system may not be the same. This may mean that if one operating system configures the system for its environment, the environment may not be optimal for the other operating systems. For example, a hardfile may change drive letters from one environment to another. This is not tolerable, especially if the customer desires to share data between the environments. The second operating system configuration may interfere with the first operating system configuration.

Another problem with multiple operating system environment is that if one operating system performs configuration and the second does not. In that case, the operating system performing configuration must take into consideration the operating system incapable of performing configuration. There are too many technical and implementation problems with relying on the operating system(s) to perform configuration in today's environment. This is the ideal situation, but until all problems are solved, use of an operating system definition file in accordance with the invention, is a good compromise.

SUMMARY OF THE INVENTION

One of the objects of the invention is to provide an improved method and apparatus allowing an operating system to provide customization data to a configuration program to enable optimal configurations.

Another object of the invention is to provide a configuration mechanism in which an operating system definition file (ODF) is used during system configuration, to allow a PS/2 system to be optimized for contemporary operating systems such as OS/2, AIX/OS/2, or other multitasking operating systems.

A further object of the invention is to provide an ODF which defines an operating environment to the Set Configuration Program, enabling the Set Configuration Program to optimize the configuration for each operating environment that the system can boot by the MultiBoot facility.

Still another object of the invention is to provide an ODF which contains keywords required to optimize the system for the operating environment.

Briefly, in accordance with the invention, an operating system definition file (ODF) is provided by each operating system stored in a computer system. Each ODF contains a list of keywords that define the operating environment for the particular operating system. During setup, a set configuration program loads each ODF and produces a master record that specifies an ordering of non-system memory regions across all of the operating systems that coexist in the computer system, allowing non-system memory allocations to be made to regions that meet all operating system needs.

BRIEF DESCRIPTION OF THE DRAWINGS

Other objects and advantages of the invention will be apparent from the following description taken in connection with the accompanying drawings wherein.

DESCRIPTION OF ILLUSTRATIVE EMBODIMENT

Figure 1:
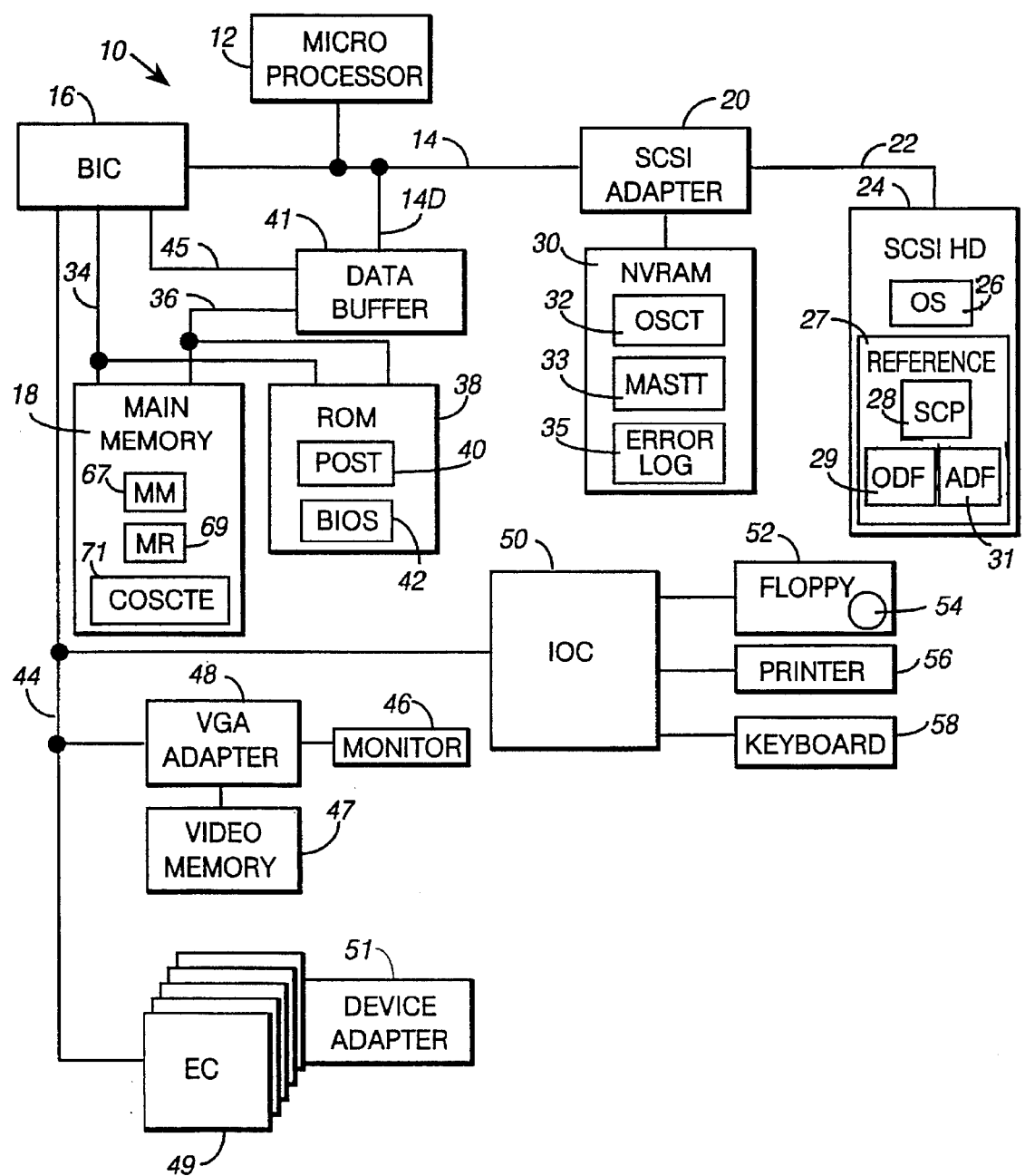
FIG. 1 is a block diagram of a data processing system embodying the invention.

Referring now to the drawings, and first to FIG. 1, a data processing system (DPS), such as a personal computer 10, comprises a microprocessor 12 connected to a local bus 14 that, in turn, is connected to a bus interface controller (BIC) 16, a data buffer 41, and a small computer system interface (SCSI) adapter 20. Computer 10 may be a PS/2 computer such as model 57 having a microprocessor 12, such as an 80486 microprocessor having 32-address pins or lines defining an address space of 4-GB. Local bus 14 includes conventional data, address, and control lines conforming to the architecture of such processor. Adapter 20 is also connected to a SCSI bus 22 which is connected to a SCSI hard drive (HD) 24 designated as the C:drive. Drive 24 stores one or more operating systems 26 that, after the system has been configured, are loaded, as needed, into memory 18 for execution by processor 12. The SCSI bus is connectable to other SCSI devices (not shown). Adapter 20 is also connected to a NVRAM 30.

BIC 16 performs two primary functions, one being that of a memory controller for accessing a main memory 18 and a ROM 38. Main memory 18 is a dynamic random access memory (RAM) that stores data and programs for processing and execution by microprocessor 12. ROM 38 stores a POST program 40 and a BIOS 42. POST program 40 performs a standard power-on, self-test of the system when computer 10 is started by turning the power on or by a keyboard reset. If POST detects a changed configuration, a configuration error signal is generated requiring the running of a set configuration program before normal operation can proceed. An address and control bus 34 connects BIC 16 with memory 18 and ROM 38. A data bus 36 connects memory 18 and ROM 38 with data buffer 41. The buffer is further connected to data bus 14D of bus 14. Control lines 45 interconnect BIC 16 and data buffer 41.

The other primary function of BIC 16 is to interface between bus 14 and an I/O bus 44 designed in conformance with the well known IBM MicroChannel (MC) architecture. Bus 44 is further connected to an input/output controller (IOC) 50 and a video subsystem comprising a video graphics array (VGA) adapter 48, video memory 47, and a color monitor 46. IOC 50 controls operation of plurality of I/O devices including a floppy disc drive 52 designated as the A:drive, a printer 56, and a keyboard 58. Drive 52 accesses a removable floppy diskette 54. In accordance with the memory architecture of PS/2 MicroChannel systems, system memory may be resident on a system board and in feature adapters connected to bus 44. The memory address space is accessible to both system microprocessor 12 and MicroChannel participants. Bus 44 is further connected to a plurality of expansion connectors 49 that form slots by which one or more device adapters 51 can be connected into the system.

It should be noted that computer 10, as thus far described, contains standard devices commonly used in a personal computer. Various other standard devices that are normally contained in a PS/2 computer, have been omitted for simplicity.

The SCSI hard disk is partitioned and contains a reference disk 27 comprising a Set Configuration program (SCP) 28, an operating system description file (ODF) 29 for each operating system 26, and one or more standard adapter description files (ADF) 31. SCP 28 is modified relative to the prior art, in accordance with the invention as described below. Each ODF 29 defines the operating environment for the particular operating system 26. Alternatively or additionally, diskette 54 may be a reference diskette containing the SCP and ODF. The following explanation assumes that items 28 and 29 are stored on reference disk 27 and loaded into main memory during the set configuration process. In response to execution of SCP 28, the operating environment information from ODF 29 is processed and used by SCP 28 to assign portions of the memory address space to system memory and to non-system memory. SCP 28 produces an operating system capability table (OSCT) 32 and a memory address space topology table (MASTT) 33, which are stored in NVRAM 30, for use by SCP 28 each time the system is configured and for use by the operating system when it is initialized and used to allocate memory as part of normal operating of the system. An error log 35 may also be created and stored in NVRAM 30.

ODF 29 includes a date record specifying the version date of the ODF and keyword records containing individual keywords and parameters as appropriate. Some keywords have one or more parameters while other keywords are used to set indicators and have no parameters. ODF 29 uses the following keywords that allow the operating system to take optimal advantage of the memory address space, the keywords being: Address_Space, Skip_Region, Begin_OS, End_OS, Non_Sys_Mem Region, OS_Name, Page, Error_Log, OS_Conf, No_Init_Prog, Share_Int, Relocate_Video, and Build_TOP. The meanings of these keywords are set forth below.

Non_Sys_Mem Region x,y,z—This keyword is used to indicates to Setup which memory regions the OS can handle and that the OS can accept non-system memory allocations in the designated memory regions. This keyword has "n" parameters, where "n" is the number of memory regions supported and is "3" in the disclosed embodiment. Each parameter is separated by a comma and is listed in the preferred order for non-system memory allocations in memory regions. Non-system memory allocations occur in the designated memory region in the parameter list, starting in the first field of the parameter list. If a device or adapter cannot support an allocation, for either software or hardware reasons, its allocation is made in the first supported memory region encountered in the list. For example, if the keyword parameters list is: 3,2,1; and an adapter can only receive a non-system memory allocation in regions 1 and 2, the allocation will occur in memory region 2 because it is the first region encountered in the parameter list that is applicable to the adapter. Region 1 must be listed. An operating system cannot support a higher region without also supporting each lower region. Thus, an operating system that supports region 3 also supports regions 1 and 2, and an operating system that supports region 2 also supports region 1. Default: Parameter default list is 1,2.

Skip_Region n—This keyword directs Setup not to assign system memory in the memory region represented by the one parameter, n. The parameter is an integer representing the memory region 2 or greater. Memory region 1 must always contain system memory. Only one region may be skipped. Default: Default is to allocate system memory in all memory region starting in memory region 1 until all memory is allocated without skipping any memory region.

Address_Space n—This keyword is used to indicate the size of the memory address space supported in the operating environment. It has one parameter. The parameter represents the size of the memory address space in megabytes, MB, or gigabytes, GB. For example, 16MB, 4096MB or 4GB. Default: Default is a memory address space of 16MB.

OS_Name 'character_string'—This keyword is used to designate the operating system name. It has one parameter. The parameter is an ASCII string delimited at the start of string and end of string by the character. This parameter is passed by first storing it at a known location and then placing a pointer to the location on the system stack. Default: Default operating system is PC/DOS.

Page—This keyword indicates to Setup that the operating environment uses demand paging. Setup does not disable any memory, but places, in the dynamic data area of NVRAM, a table containing a list of all known real addresses of memory containing a non-recoverable error. This enables the operating environment to mark each page containing the error as bad and recover the remaining physical memory for its use. Default: The default is that the operating environment does not use paging.

Error_log—This keyword indicates to Setup that the operating system performs error logging. All POST errors should be place in non-volatile storage. The error log is stored in the dynamic data area of the NVRAM indexed under the operating system ID. POST also leaves an indicator that error statistics should be kept and returned to the operating system on all device operations by CBIOS and ABIOS. Default: The default has no operating system error logging.

OS_Conf—This keyword stops Setup from doing the configuration thereby allowing the operating system to perform all configuration operations. Default: The default is for Setup to perform all configuration tasks.

No_Init_Prog—This keyword indicates that the operating system does not want initialization programs or data installed on track 0. If an adapter requires an initialization program or data, it will be disabled. Default: The default is for initialization programs and data installation.

Share_Int—This keyword indicates to Setup which interrupt levels can be shared. This keyword has up to 15 parameters, one for each possible interrupt level. Those adapters/devices which require a dedicated interrupt level, will be given priority over those devices capable of sharing interrupts. Default: The default is for Shared Interrupts on all levels.

Build_TOP—This keyword causes a memory address space topology table (MASTT) 33 to be built and stored in a dynamic data area of NVRAM 30. The operating system later accesses the table during its initialization and uses it for allocating memory. An entry in the table includes the following items: start address, end address, memory type (system memory, non-system memory), cache attribute-(cached, non-cached), and location (planar, non-planar}. There is an individual entry in the topology table for each memory allocation for an adapter or planar device. Default: do not build MASTT.

Begin_OS—This keyword is used to indicate the start of an operating system environment within an ODF. Multiple operating systems can be specified in a single ODF, and this keyword indicates the start of one operating environment. One OSCT entry is built for an operating environment described by all keywords between Begin—OS and End_ OS keywords. If no Begin_OS keyword is present, only one operating system environment is specified in the ODF.

End_OS—This keyword is used to indicate the end of an operating system environment within and ODF. Multiple operating systems can be specified in a single ODF, and this keyword indicates the end of one operating environment. An end-of-file conditions also terminates an operating environment in the ODF.

Relocate_Video n,m—This keyword is used to indicate to Setup and POST that prior to booting of the operating system, the video buffer is to be moved from the video frame buffers stored in memory region 1 at addresses A0000h to EFFFFh, to a location specified by the parameter "n" for a length specified by the parameter "m". Both parameters are specified in units of megabytes and in non-system memory. Setup allocates the video buffer consistent with other characteristics specified by the operating environment. The assigned address is stored in the OSCT entry in NVRAM 30.

During powerup, POST checks the NVRAM for the Relocate_Video record in any OSCT entry and moves the video buffer prior to booting the operating system. Default: the video buffer is not relocated.

The user, during a Setup process, copies the ODF (or ODFs if more than one OS is present) to the System Reference Diskette 54 or System Reference Diskette Image in partition 27. If no ODF file is present during configuration, Setup uses the default values above. The default values assume the least common denominator across all operating environments. Therefore, a PS/2 Micro Channel system is configured by default for the PC/DOS operating environment.

An Operating System Description Program, ODP, is similar to the ADP defined in the PS/2 Hardware Interface Technical Reference-Architecture Manual, S84F-9808. The ODP supports one additional function called non-system memory allocation, plus any other previously defined function supported by the ADP that is appropriate to an operating system. An ODP file, if present, is provided in an identical manner to an ODF.

Figure 2:
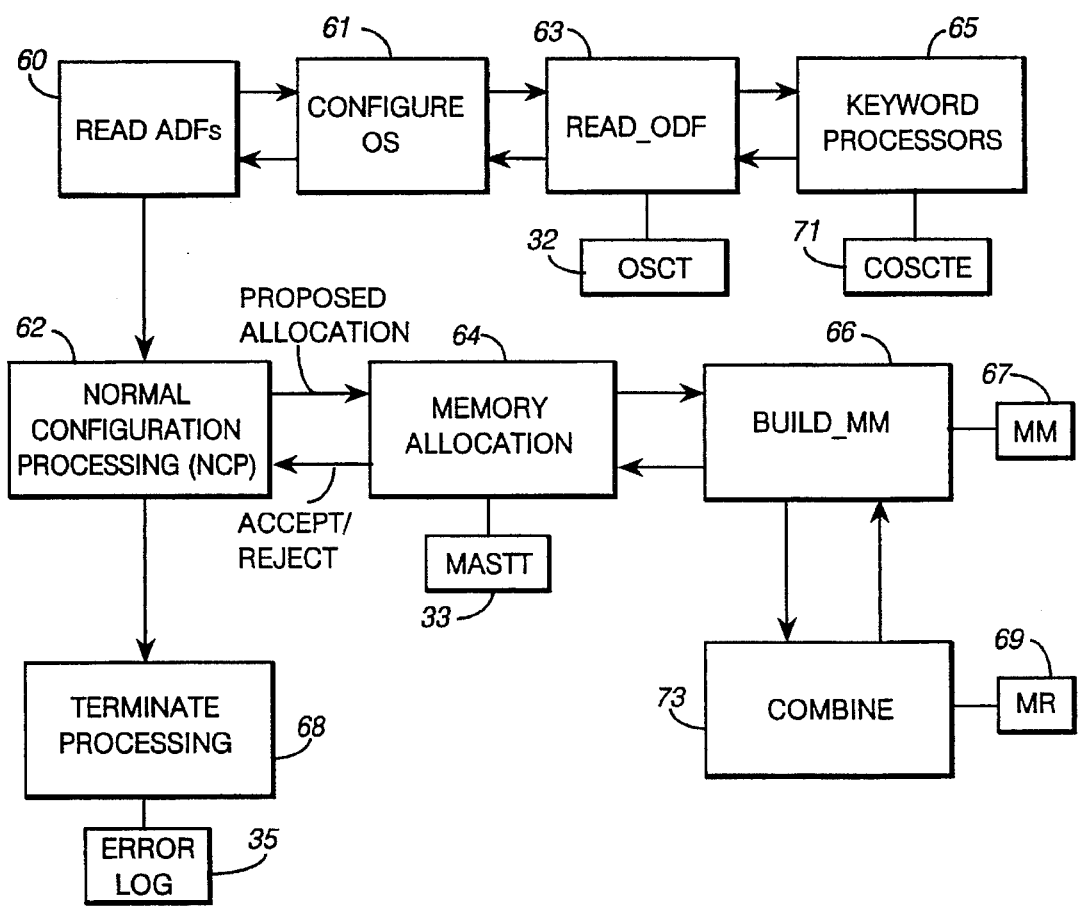
FIG. 2 is a schematic diagram of the Set Configuration Program (SCP) shown in FIG. 1.

Referring now to FIG. 2, during a setup process, SCP 28 is called in standard fashion to perform the configuration process, and SCP 28 is read into main memory 18 for execution or processing. SCP 28 comprises a Read ADFs routine 60, a Configure OS routine 61, a Normal Configuration Processing (NCP) routine 62, a Read_ODF routine 63, a Memory Allocation routine 64, Keyword Processors 65, a Build Memory Matrix (Build_MM) routine 66, a Combine routine 73 and a Terminate Processing routine 68. Routines 60, 62, and 68 provide the same configuring processing as they do in the prior art, while modifications to such routines and the remaining routines shown in FIG. 2 provide the ODF processing of the invention.

Read ADFs routine 60 performs preprocessing prior to normal configuration processing routine 62 (hereinafter referred to as NCP 62). Routine 60 reads the ADFS, planar definition files, ADPs and INIT (initialization) programs, into main memory and then calls the Configure OS routine 61 to perform ODF preprocessing. Routine 61 reads OSCT 32 into main memory if such table exists, finds ODF 29, and then calls READ_ODF routine 63 to processes each ODF entry during the course of which keyword processors 65 are called to build current OSCT entries (COSCTE) 71 and set indicators needed for BIOS, POST BIOS, and the OS. If an ODF 29 does not exist, routine 61 builds a default ODF using default parameters, and the default ODF would then be passed to routine 62 to produce the restrictive configuration normally associated with the PC/DOS operating environment. Upon completion of each COSCTE 71, routine 63 stores the information as an OSCT entry in OSCT 32 in NVRAM 30. OSCT 32 contains a plurality of OSCT entries, there being one OSCT entry for each operating environment. Each OSCT entry in table 32 has a fixed length divided into a number of fields for storing the parameters, indicators and default values resulting from processing the keywords in the ODF records.

Upon completion of such preprocessing, NCP 62 first configures each adapter in the normal manner. This includes evaluating the choices and resolving any conflicts for the adapters. Then, NCP 62 decides if a memory allocation is needed for either system memory or non-system memory. If so, it sets up a proposed allocation and calls memory allocation subroutine 64. The general function of routine 64 is to determine if the allocation is optimal for the particular operating environment. For non-system memory allocation, routines 66 and 73 build merge matrix (MM) 67 in main memory 18 to merge the different operating environments, find the most restrictive configuration among them, and build a master record 69 in the main memory. Routine 64 builds MASTT 33 if a particular indicator (described below) has been set. Routine 64 notifies NCP 62 as to whether it has accepted or rejected the proposed allocation. The interaction between routines 62 and 64 is iterative if routine 64 rejects any choice made by routine 62 or if routine 62 finds any conflict with allocations made by routine 64. In either case, the process is repeated using a different choice or making a different allocation, until a suitable allocation is accepted. Finally, NCP 62 completes the normal configuration processing and terminate routine 68 is executed to store any error log 35 in NVRAM and relocate video memory if needed.

In the flow charts now to be discussed, the arrows indicate the direction or sequence in which the various functions are performed. The results of decisions or determinations in the diamond shaped decision boxes are indicated by "Y" for yes or positive results, and "N" for no or negative results. Oval shaped connectors contain characters that indicate the destination or source by reference letter and figure number. For example, the connector at the bottom of FIG. 3B contains "A-3C" meaning "go to connector A in FIG. 3C".

Figure 3A:
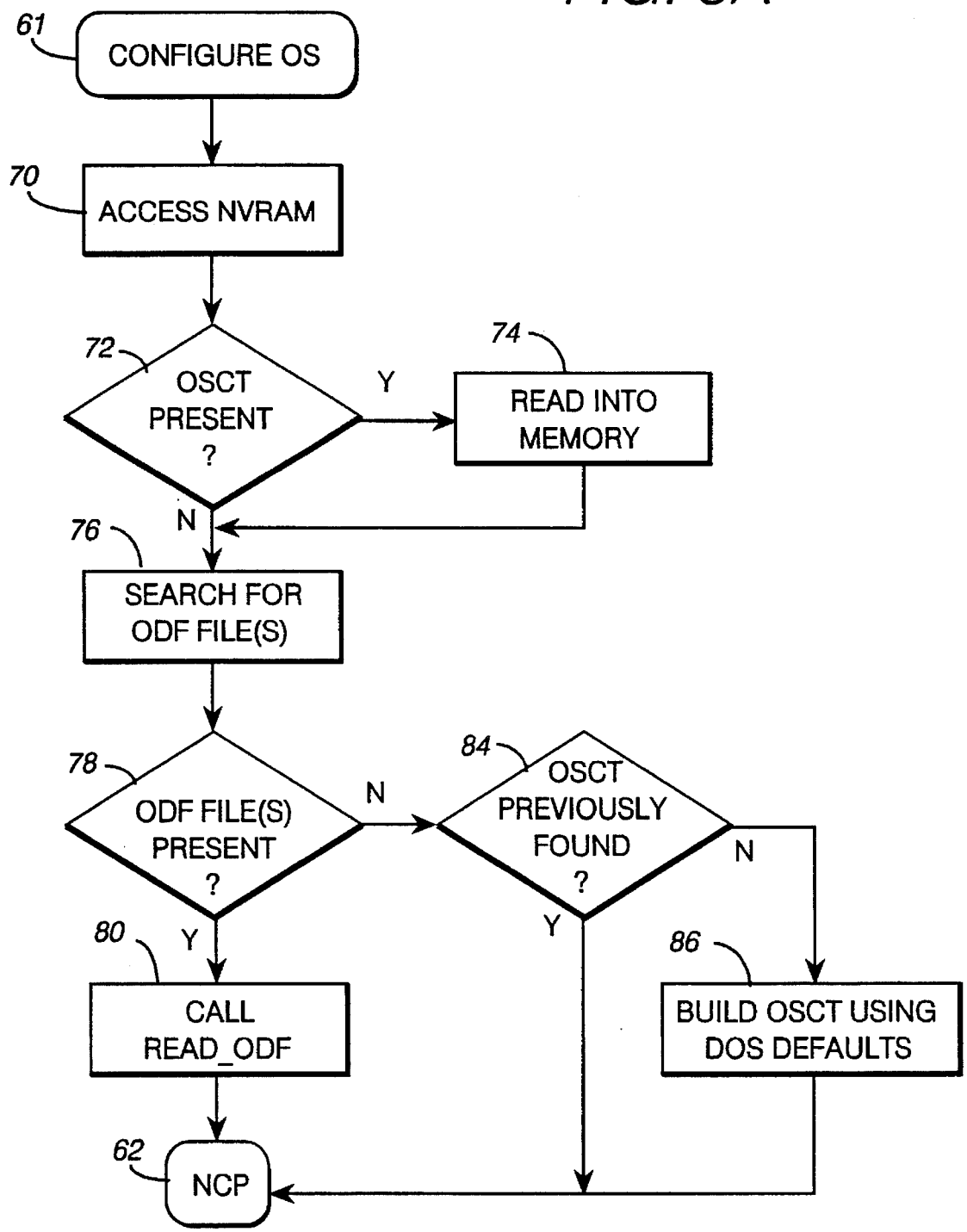
FIGS. 3A–3C are a flow chart of the Configure OS routine shown in FIG. 2.
Figure 3B:
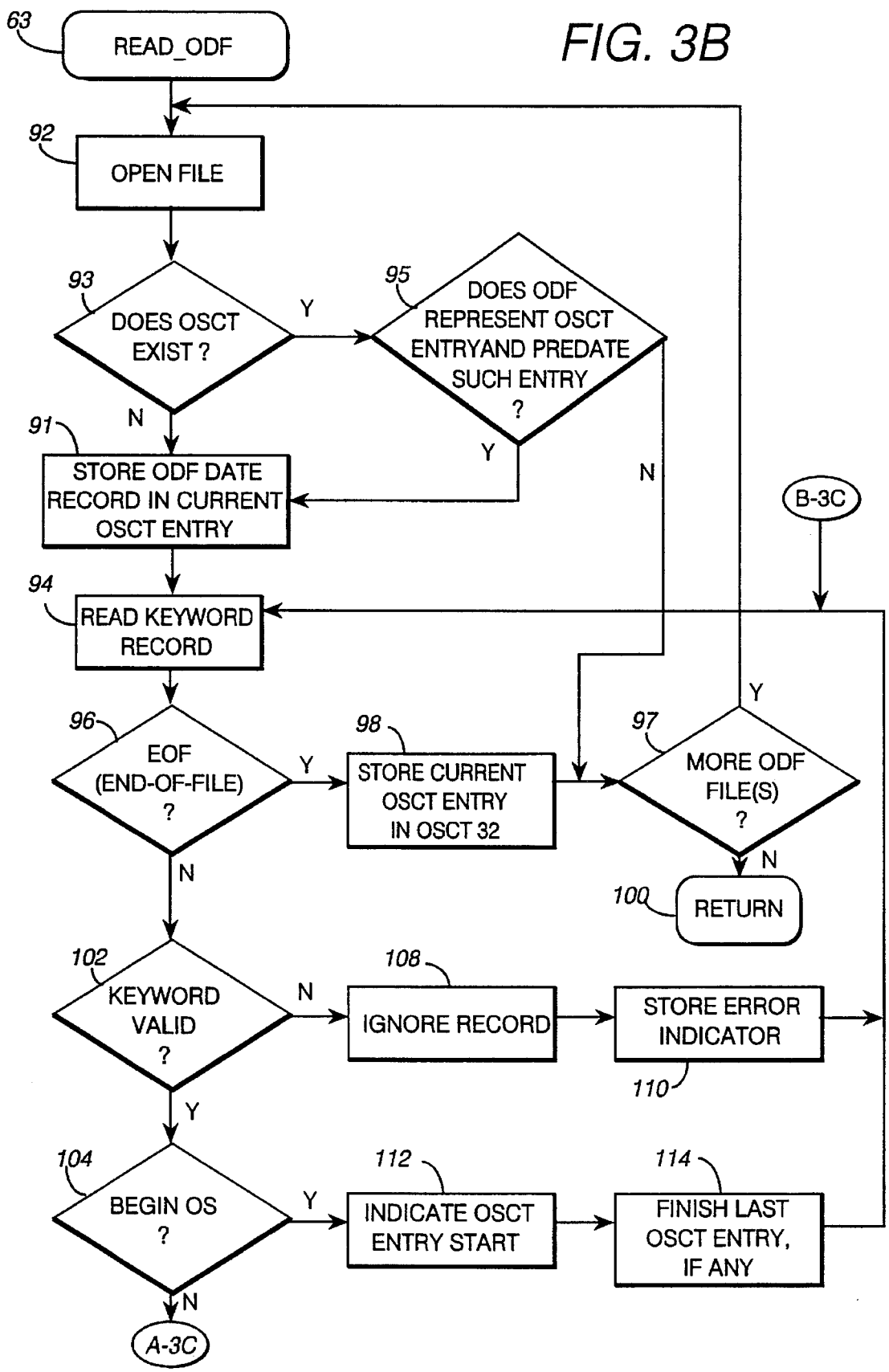
Figure 3C:
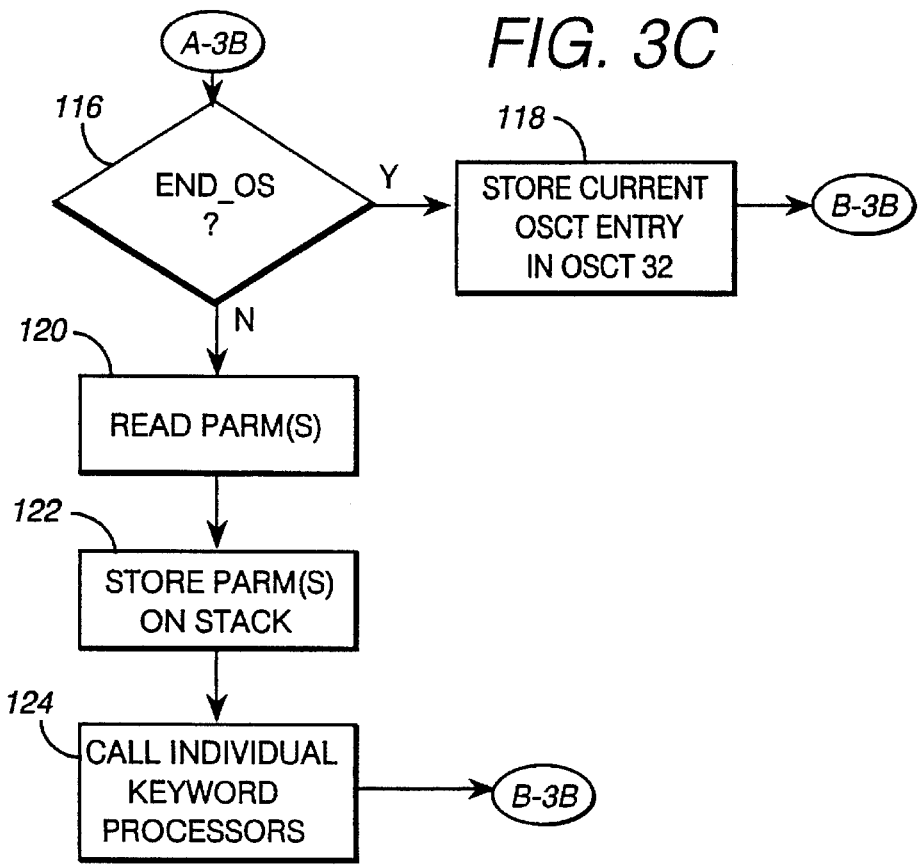

Details of Configure OS routine 61 are shown in FIGS. 3A–3C to which reference is now made. Step 70 first accesses NVRAM 30 and step 72 determines if OSCT 32 is present. If OSCT 32 is present, the table is read at 74 into main memory for processing, after which step 76 searches for ODF file 29. If no table is found, step 76 occurs right after step 72. Step 78 decides if the ODF file is present and if it is, READ_ODF routine 63 is called in step 80, after which a return is made to NCP 62. If no ODF file is present, step 84 decides if OSCT 32 was found previously in 72. If it was not found, step 86 builds OSCT using PC/DOS defaults. After either of steps 84 or 86, a return is made to NCP 62.

READ_ODF routine 63 (FIG. 3B) begins with step 92 in which ODF 29 is opened. Step 93 determines if OSCT exists for the file. If not, step 91 reads the date record of the ODF and stores it in the date record of the current OSCT entry. Then, a keyword record is read at 94. Step 96 determines if an end-of-file (EOF) has been reached. If so, step 98 stores the completed current OSCT entry 71 in OSCT 32, and step 97 checks to see if there are any more ODF files for additional operating system. If there are no additional ODFs (meaning that all ODFs have been processed), a return 100 is made to the caller. If there is an additional ODF, step 97 then loops back to step 92 to repeat the process. When step 93 produces a positive result, step 95 determines if the ODF opened in step 92 represents an OSCT entry and predates such OSCT entry. If not, a branch is made to step 97 and the ODF file is bypassed. If step 95 produces a positive result, step 91 is performed.

If step 96 produces a negative result, which occurs when the end-of-file has not been reached, the record read in step 94 is then processed. Step 102 determines if the keyword in the record is valid or allowable. If not, step 108 ignores the record, step 110 stores an error indicator, and a branch is made back to step 94 to read the next record. If the outcome from step 102 is positive, step 104 determines if the keyword is "BEGIN_OS".If so, step 112 indicates the start of an OSCT entry, step 114 finishes the last OSCT entry, if any exists, and a return is made back to step 94.

If the result of step 104 is negative, step 116 (FIG. 3C) decides if the keyword is "END_OS". A "yes" decision results in step 118 storing the completed current OSCT entry in OSCT 32 and then returning to step 94 to read the next record. A "no" decision from step 116 causes step 120 to read the keyword parameters from the record and store the parameters at 122 on the system stack. Step 124 then calls the appropriate keyword processor. Upon a return being made from the keyword processor, a branch is made back to step 94.

Figure 4A:
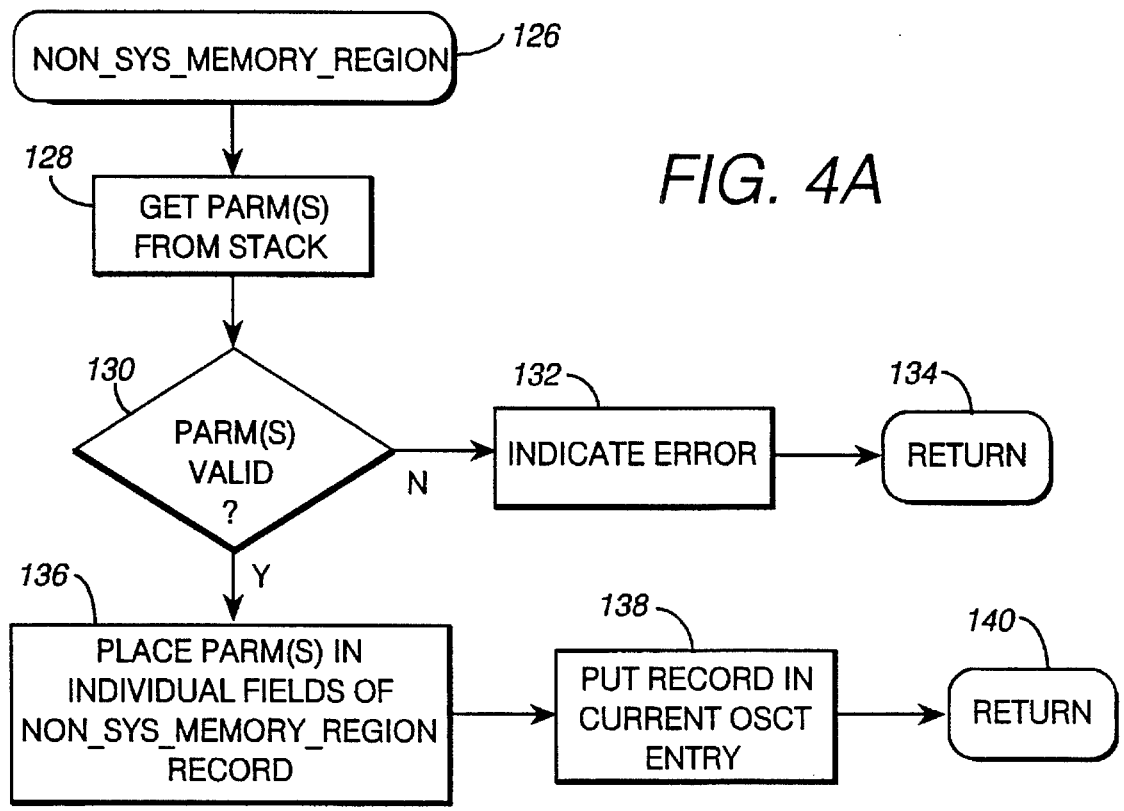
FIGS. 4A–4K are a flow chart of the Keyword Processor subroutines shown in FIG. 2.
Figure 4B:
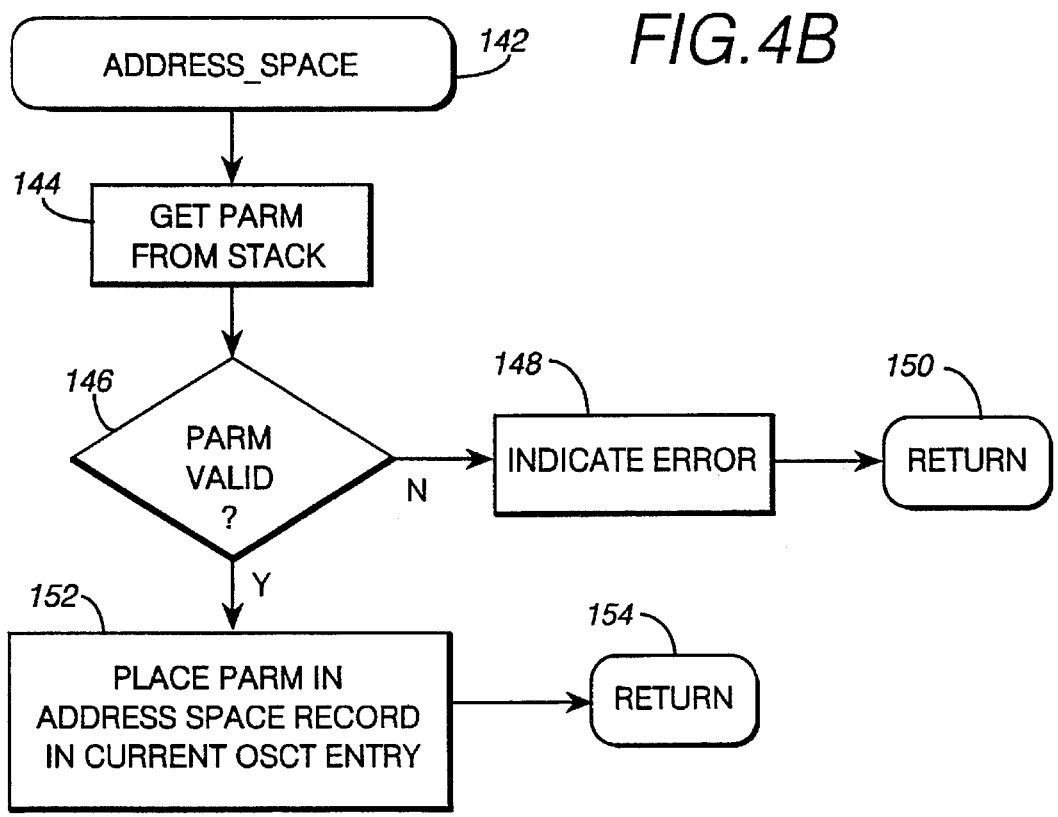
Figure 4C:
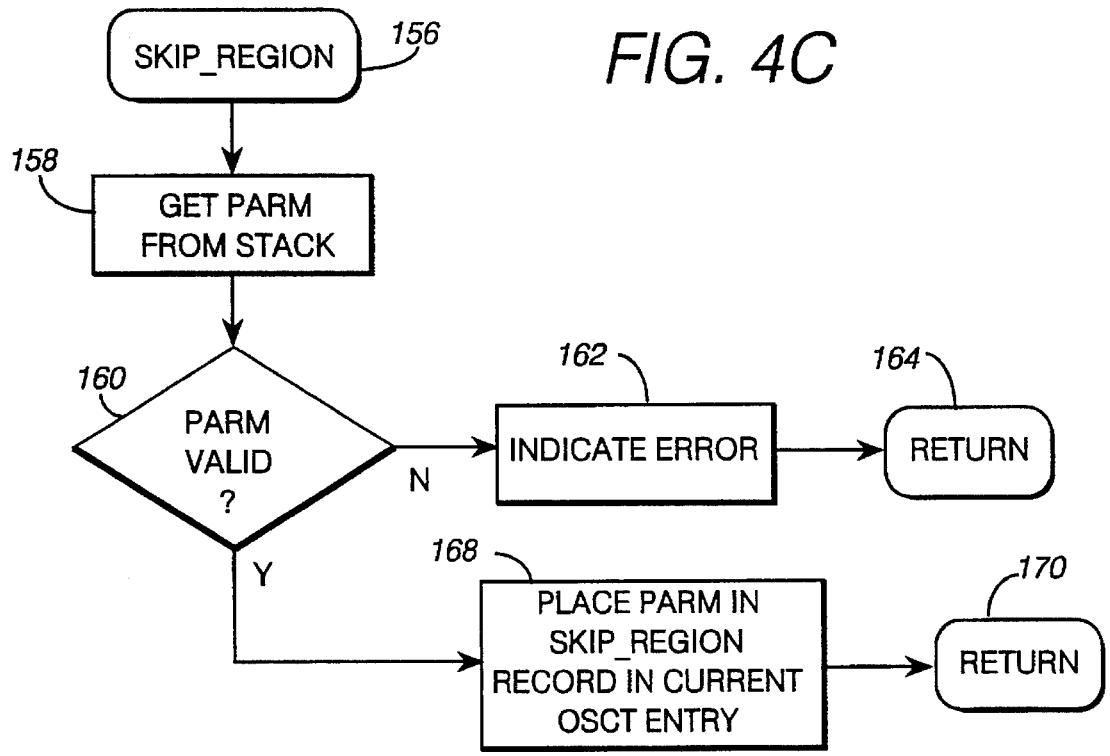
Figure 4D:
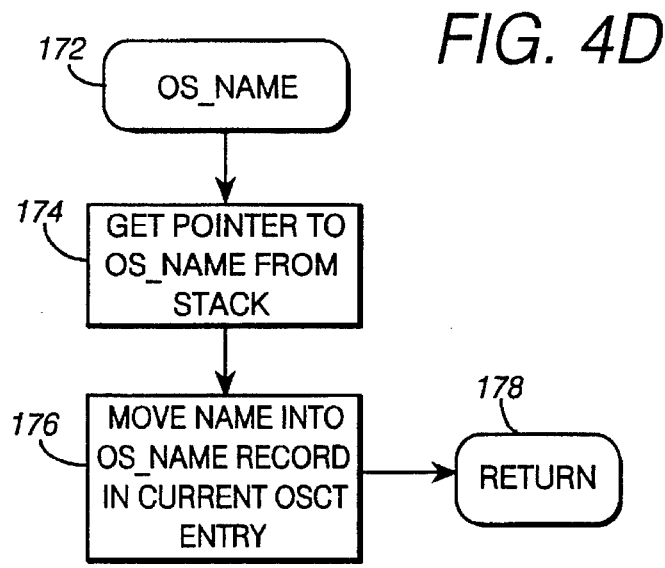
Figure 4E:
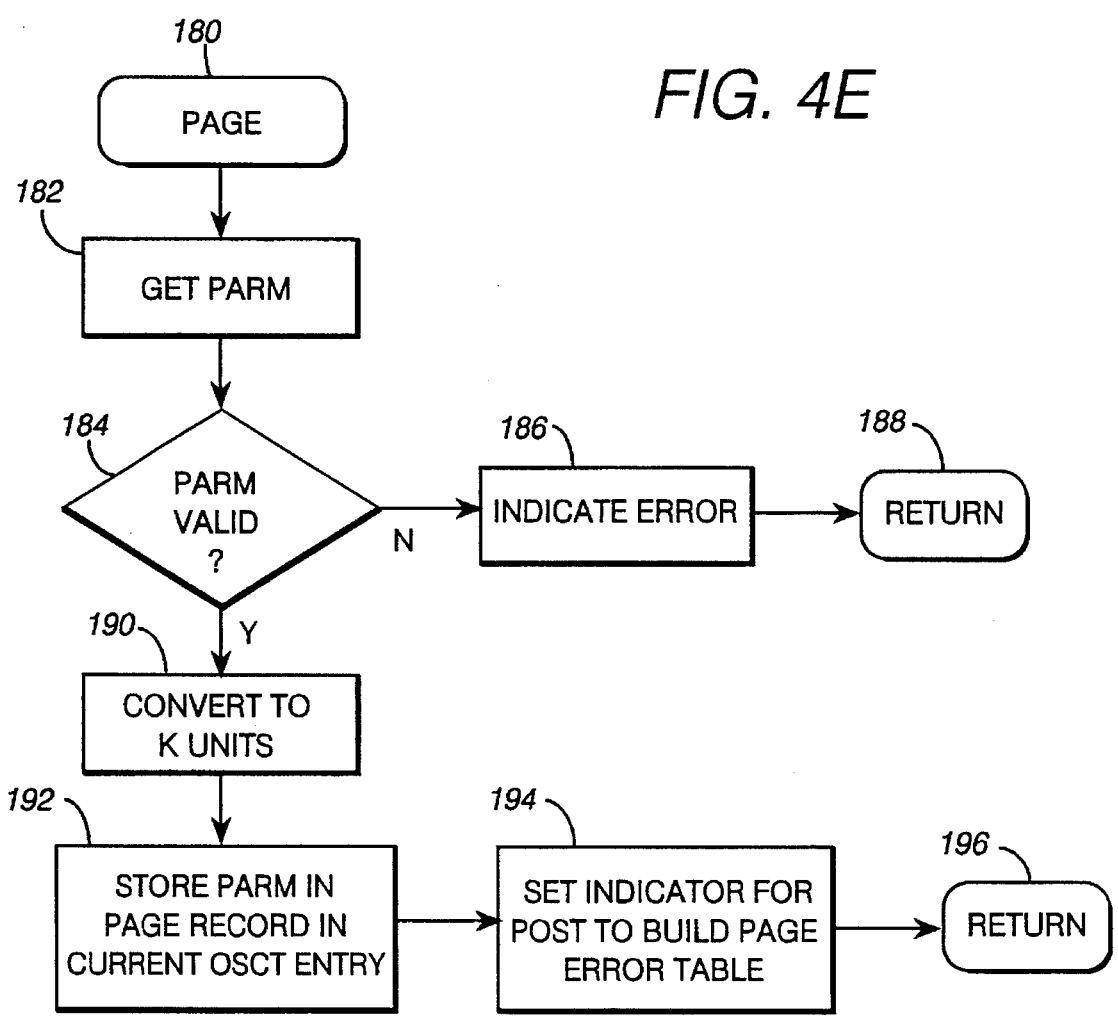
Figure 4F:
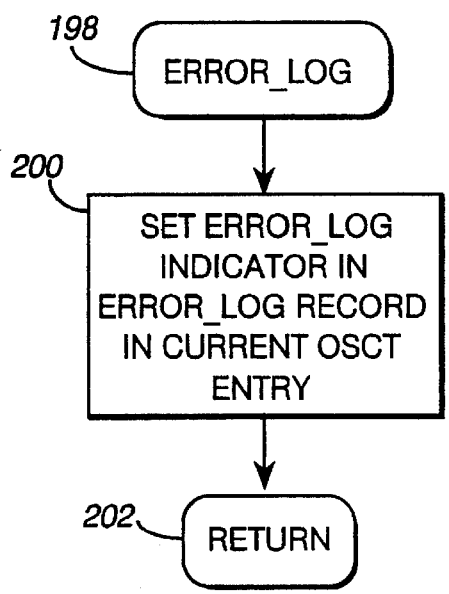
Figure 4G:
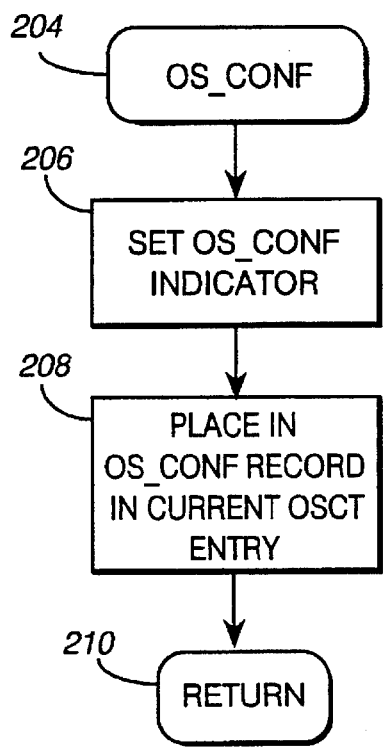
Figure 4H:
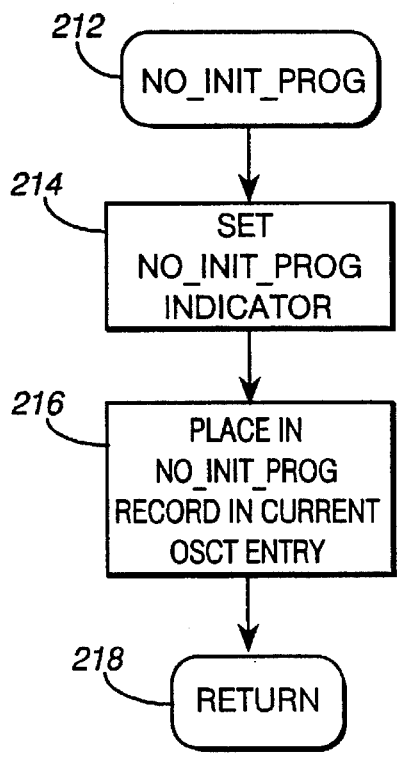
Figure 4I:
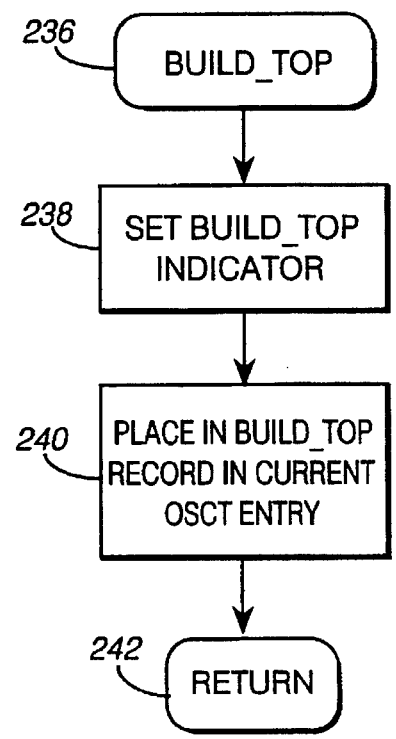
Figure 4J:
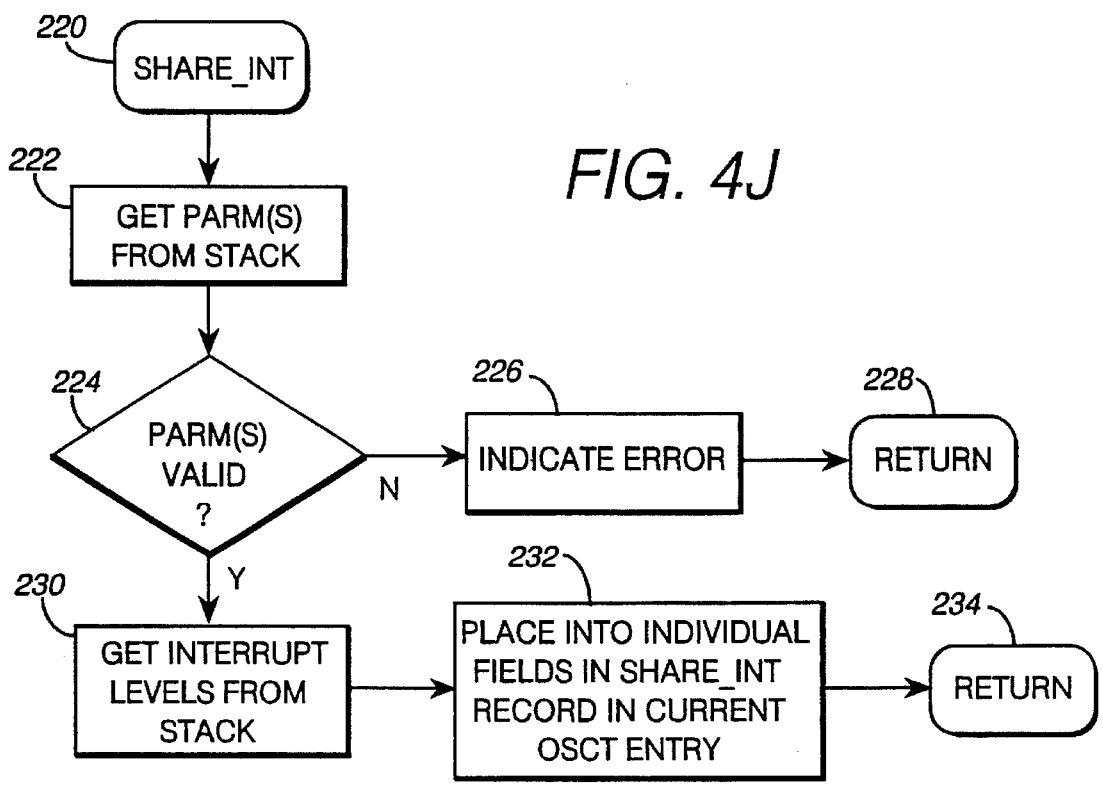
Figure 4K:
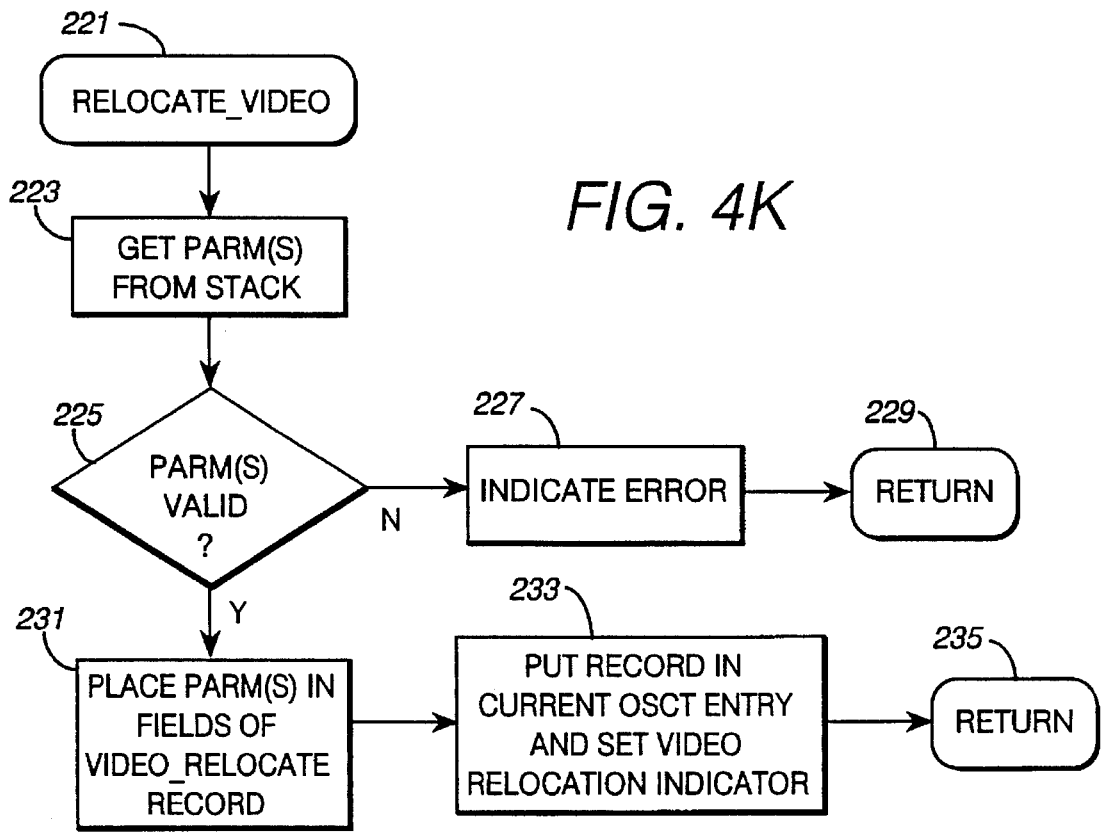

The various keyword processors are illustrated in FIGS. 4A–4K to which reference is now made. Referring first to FIG. 4A, NON_SYS_MEMORY_REGION processor or routine 126 first reads or gets the parameters from the stack in step 128, and step 130 determines if the parameters are valid, i.e., the number of parameters is proper and their values are in the correct range. If the parameters are not valid, step 132 indicates an error and a return 134 is made to routine 63. If the parameters are valid, step 136 places the parameters in the individual fields in a NON_SYS_MEMORY_REGION record and step 138 then places such record in the current entry of the OSCT being built by the process. Finally, a return 140 is made to the caller.

ADDRESS_SPACE processor 142 (FIG. 4B), in a manner similar to processor 126, gets the parameters from the stack, checks their validity, indicates an error and returns to caller in steps 144, 146, 148, and 150. If the parameters are valid, step 152 places the parameters in the ADDRESS_SPACE record of the current OSCT entry and then returns in 154.

SKIP_REGION processor 156 (FIG. 4C), gets the parameters from the stack, checks their validity, indicates an error and returns to caller in steps 158, 160, 162, and 164. If the parameters are valid, step 168 places the parameters in the SKIP_REGION record of the current OSCT entry and then returns in 170.

OS_NAME processor 172 (FIG. 4D) gets a pointer, in step 174, to OS_NAME from the stack, moves the name into the OS_NAME record of the current OSCT entry in step 176, and returns to caller in step 178.

PAGE processor 180 (FIG. 4E), gets the parameters from the stack, checks their validity, indicates an error and returns to caller in steps 182, 184, 186, and 188. If the parameters are valid, step 190 converts the parameters to "K" units, step 192 stores the parameters in the PAGE record in the current OSCT entry, step 194 sets an indicator for POST to build a memory address error table, and step 196 returns to caller.

ERROR_LOG routine 198 (FIG. 4F) merely sets the ERROR_LOG indicator in the ERROR_LOG record in the current OSCT entry in step 200 and returns to caller in step 202. OS_CONF routine 204 (FIG. 4G) sets (step 206) the OS CONF indicator, places the OS_CONF record in the current OSCT entry in step 208, and returns to caller in step 210. NO_INIT_PROG routine 212 (FIG. 4H) sets the NO_INIT_PROG indicator in step 214, places the NO_INIT_PROG record in the current OSCT entry in step 216 and returns to caller in step 218. BUILD_TOP routine (FIG. 4I) 235 sets the BUILD_TOP indicator of the BUILD_TOP record in step 238, places the BUILD_TOP record in the current OSCT entry in step 240, and returns to caller in step 242.

SHARE_INT processor 220 (FIG. 4J), gets the parameters from the stack, checks their validity, indicates an error and returns to caller in steps 222, 224, 226, and 228. If the parameters are valid, step 230 gets the interrupt levels from the stack, step 232 places the levels into individual fields in the SHARE_INT record in the current OSCT entry, and step 234 returns to caller.

Relocate_Video routine (FIG. 4K) initially gets the parameters from the stack in step 223, the parameters are checked in step 225. If they are not valid, step 227 indicates an error and a return 229 is made to caller. If the parameters are valid, step 231 places the parameters in predetermined fields of a Video_Relocate record, and step 233 puts the record in the current OSCT entry and sets a video relocation indicator to direct the configuration program to relocate the video memory from the position it normally occupies in region 1 of the DOS environment. A return 235 is then made to caller.

Figure 5A:
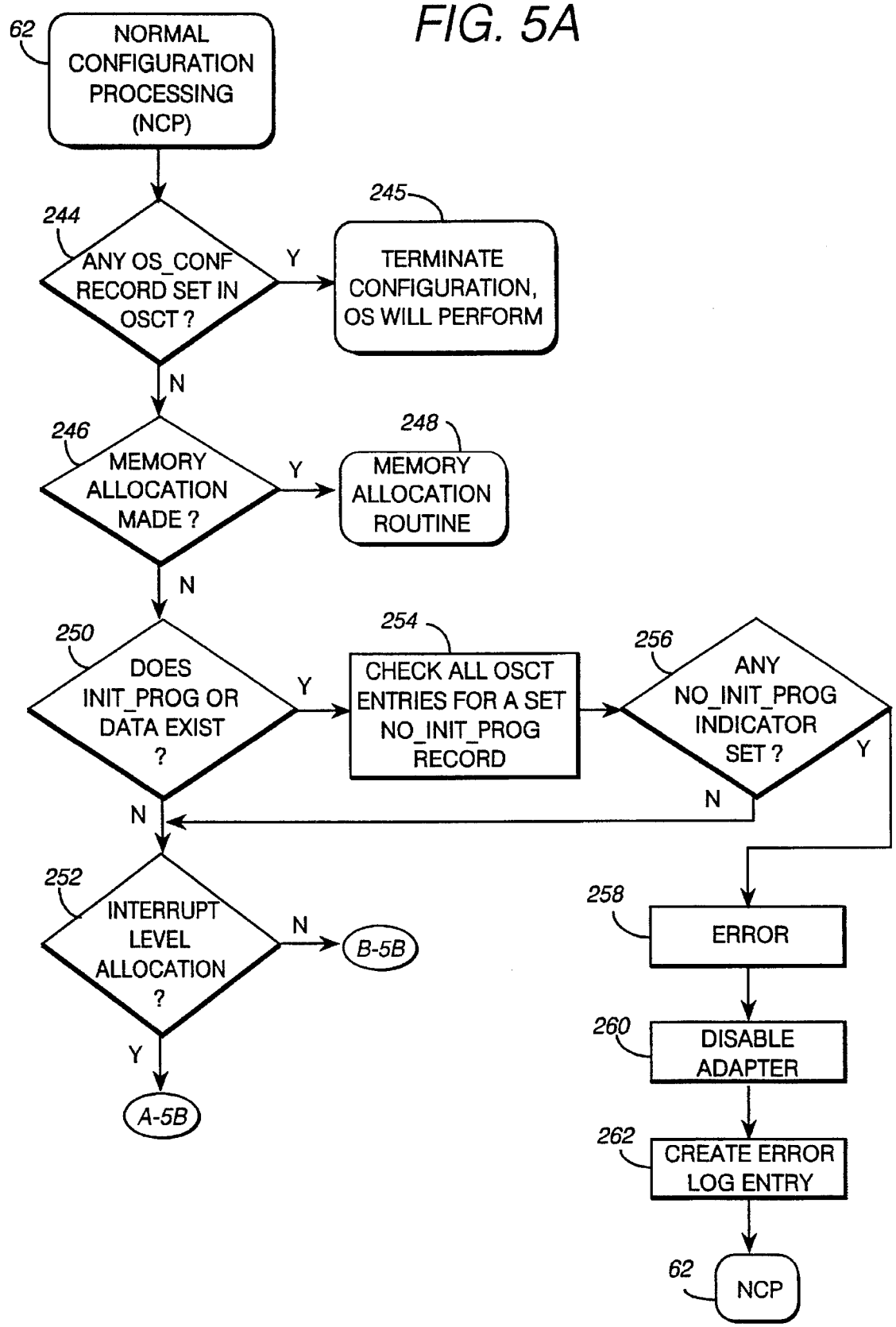
FIGS. 5A–5B are a flow chart of modifications to the Normal Configuration Processing routine shown in FIG. 2.
Figure 5B:
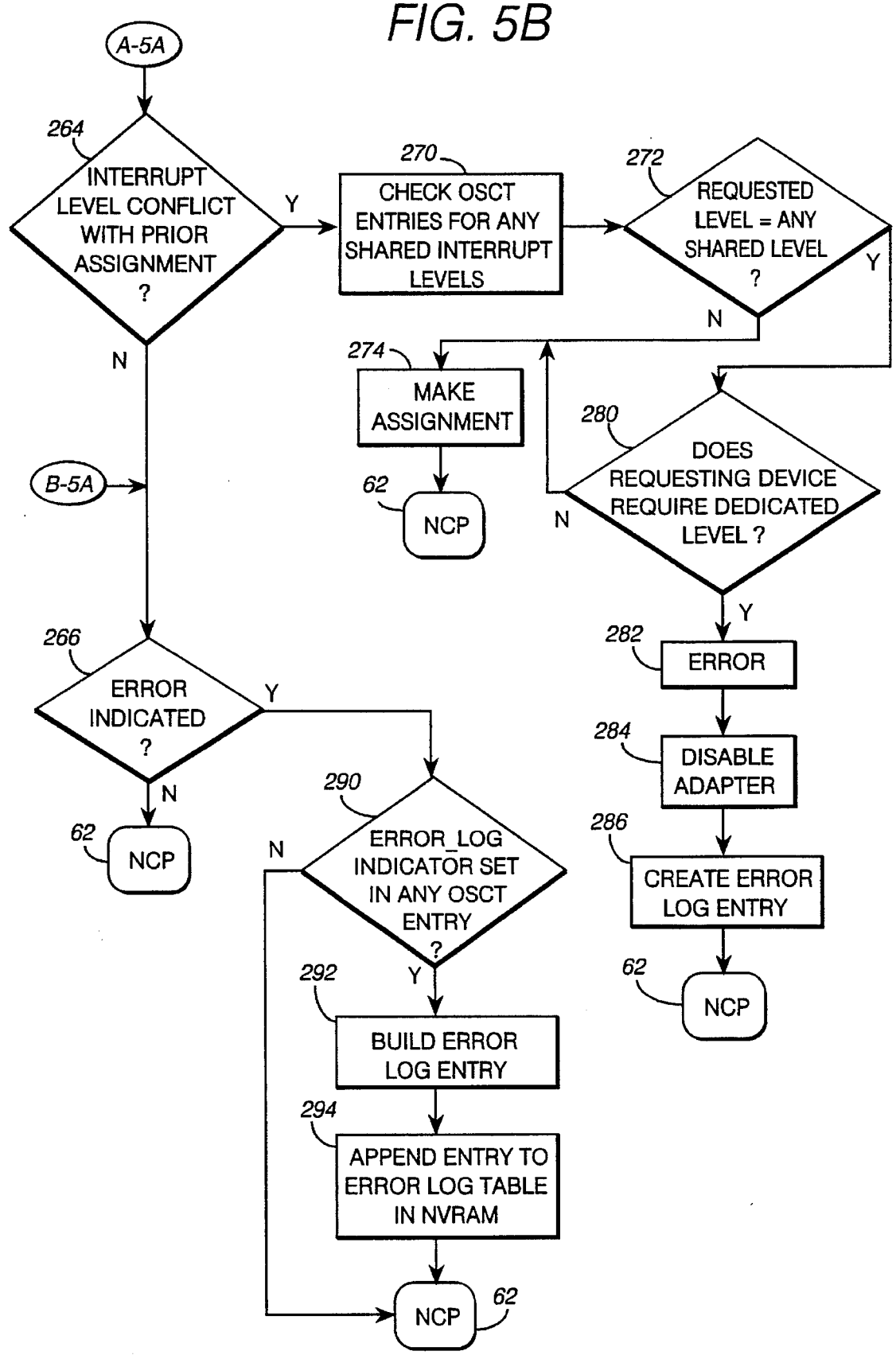

FIGS. 5A and 5B show the modifications to NCP 62 that are made in accordance with the invention, the modifications being ones of addition of functions. The boxes referenced by numeral 62 in FIGS. 5A and B represent portions that are unchanged. After the ADFs and ADPs have been processed, step 244 checks to see if any OS_CONF record is set in the OSCT. If so, step 245 terminates the process allowing the operating system to perform the configuration. It should be noted that no operating system is believed to currently perform such function and that this feature has been added for potential future use. If such record is not set, step 246 decides if any proposed memory allocation has been made. If so, step 248 branches to memory allocation routine 64. If a memory allocation is not needed, step 250 checks for the existence of any Init programs or data. If some exist, step 254 checks all the NO_INIT_PROG records in the OSCT and step 256 determines if any NO_INIT_PROG indicator is set. If the indicator is set, step 258 deduces an error has occurred, step 260 disables the adapter, step 262 creates an error log entry, and NCP 62 continues its normal processing. If the NO_INIT_PROG indicator is not set, step 252 determines if an interrupt level allocation is needed. Step 252 also occurs in response to a positive result from step 250.

If an interrupt level allocation is needed, step 264 (FIG. 5B) decides if the desired interrupt level conflicts with a prior interrupt level assignment. If it does, step 270 checks Share_Int records in OSCT entries for any shared interrupt levels and step 272 determines if the requested level is a shared interrupt level. If it is, step 280 decides if the requesting device requires a dedicated level. If so, step 282 indicates an error, step 284 disables the adapter for the requesting device, step 286 creates an error log entry, and NCP 62 continues normal processing. If either of steps 272 or 280 make a negative determination, step 274 make the requested assignment and NCP 62 continues normal processing.

If step 264 results in a negative decision or if the result of step 252 is positive, step 266 decides if an error is indicated by analyzing an error indicator set by the SCP. If not, NCP 62 continues normal processing. If so, step 290 decides if the ERROR_LOG indicator is set in any OSCT entry and NCP 62 continues normal processing if no such indicator is set. If one is set, step 292 builds an error log entry, and step 294 appends the entry to error log table 35 in NVRAM 30, prior to NCP 62 continuing with normal processing.

Figure 6A:
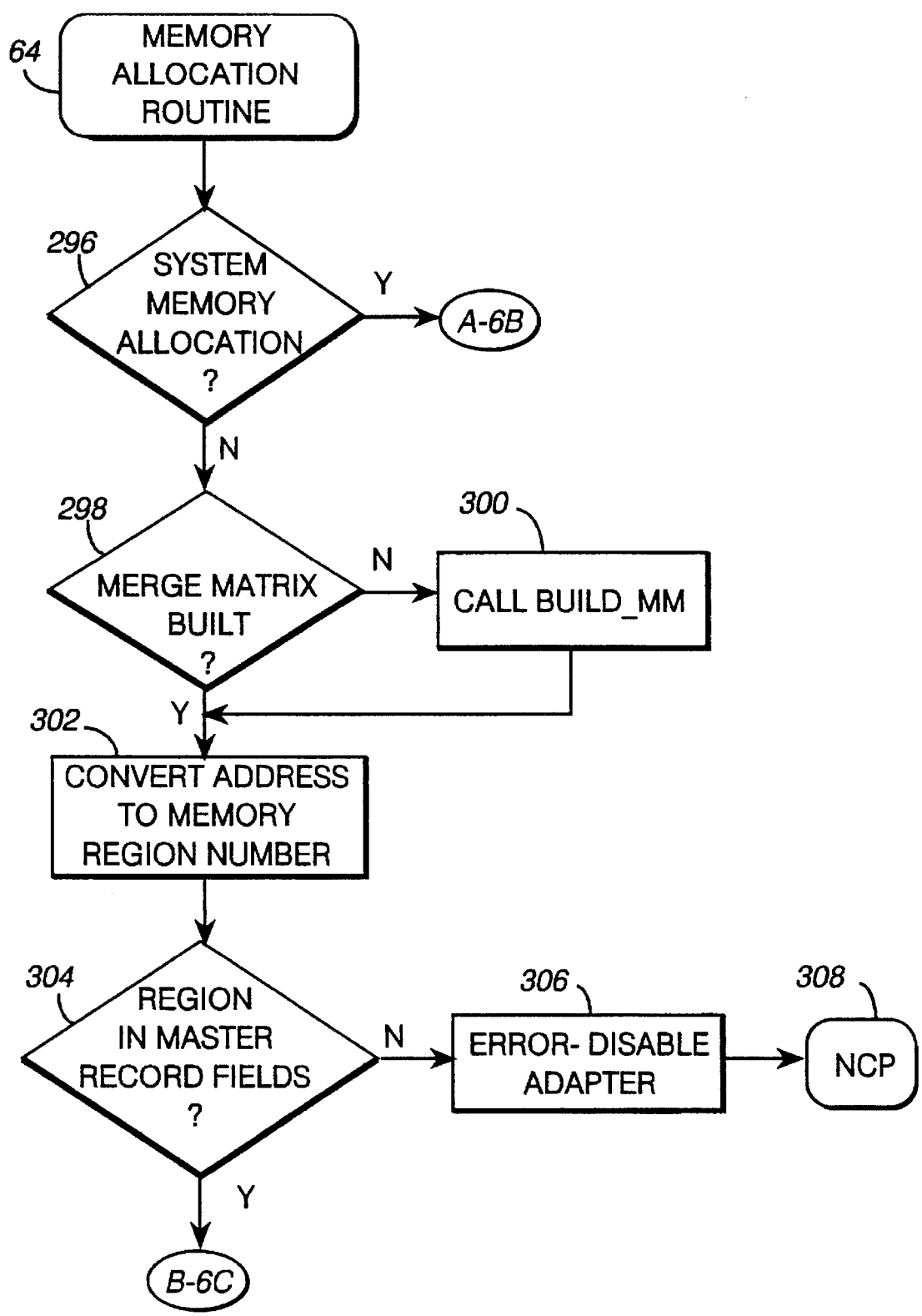
FIGS. 6A–6C are a flow chart of the Memory Allocation routine shown in FIG. 2.

As indicated above, NCP 62 makes a proposed memory allocation and then calls memory allocation routine 64. The proposed allocation identifies the type of allocation as to whether the allocation is for system memory or non-system memory, and specifies the proposed memory address. Referring to FIG. 6A, memory allocation routine 64 begins with step 296 deciding if the allocation is needed for system memory or non-system memory. If it is for system memory, a branch is made to step 310 described below with reference to FIG. 6B. If the requested allocation is for non-system memory, step 298 determines if a merge matrix (MM 67) has been built. If not, step 300 calls BUILD_MM routine 66. Upon return, or if step 298 results in a positive result, step 302 converts the allocated address to a memory region number. Step 304 decides if such memory region is in any one of the master record fields. If not, step 306 deduces an error and the adapter is disabled after which NCP 62 continues normal processing. If step 304 decides positive, the processing continues with step 326 described below with reference to FIG. 6C.

Figure 6B:
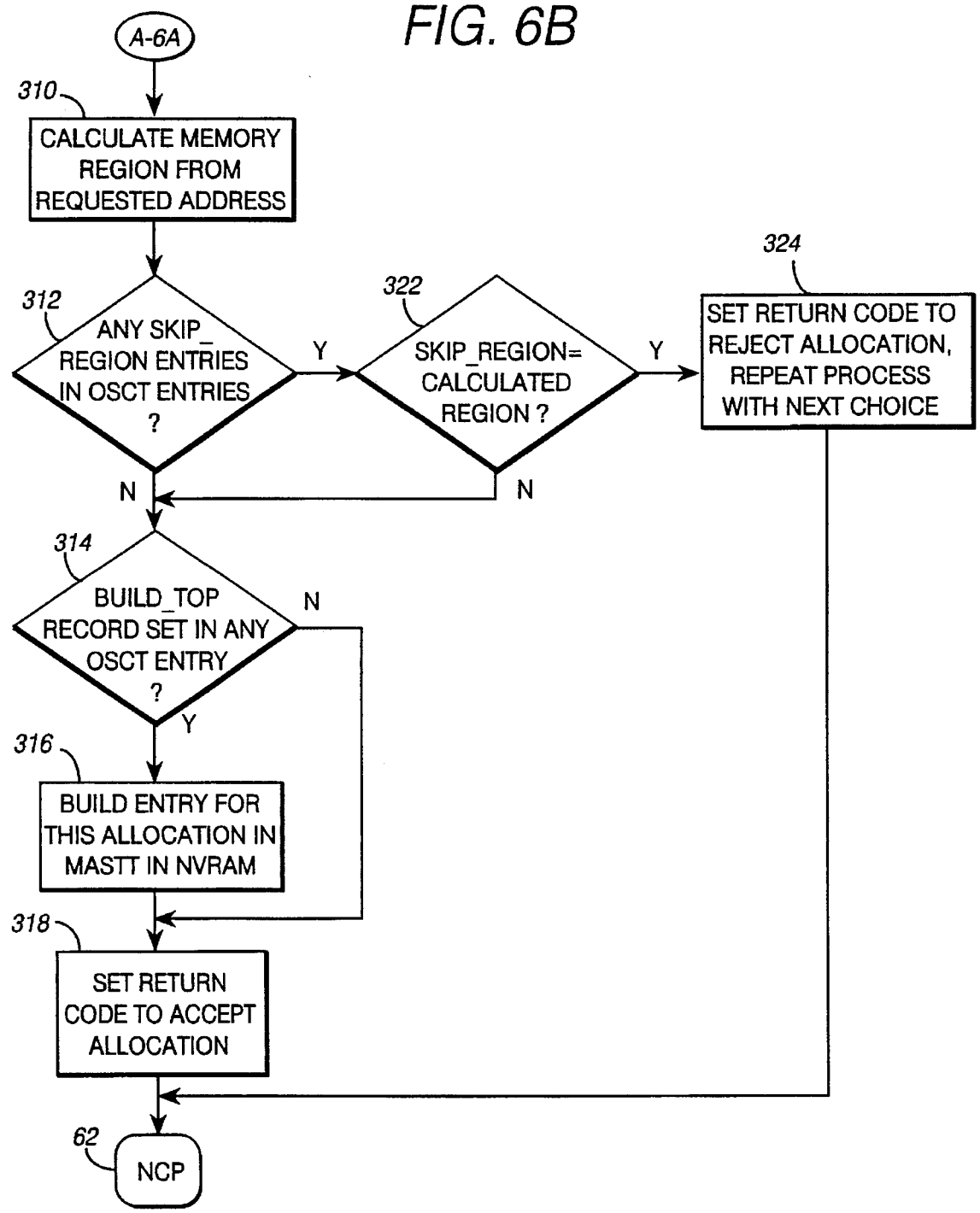
Figure 6C:
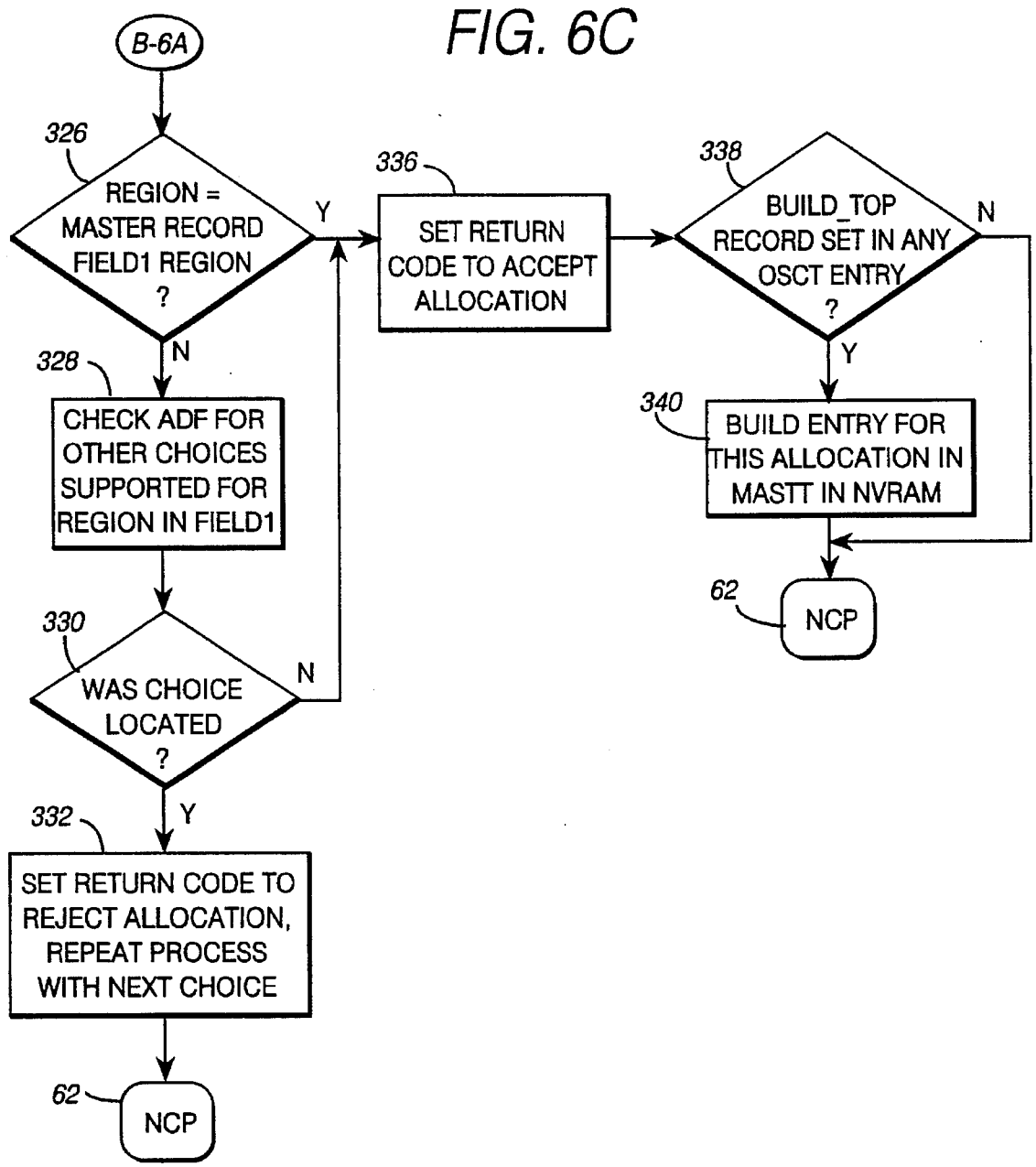

Referring to FIG. 6B, step 310 calculates the memory region from the allocated address and step 312 determines if there is any SKIP_REGION entries in the OSCT entries. If so, step 322 decides if the skip region is the same as the calculated region. If so, step 324 sets a return code to indicate the proposed allocation is rejected and returns to NCP 62 to repeat the process for the next choice. If either of steps 312 or 322 decide negatively, step 314 determines if the BUILD_TOP record is set in any OSCT entry. If so, step 316 builds an entry for the particular allocation, in MASTT 33. Following step 316 or a negative result from step 314, step 318 accepts the proposed allocation by setting the return code to indicate acceptance and NCP 62 continues normal processing. The return code is the means by which NCP 62 is notified of the results of the memory allocation routine 64.

Step 326 (FIG. 6C) determines if the memory region determined in step 302 is the same as the region set forth in FIELD1 of the master record. If it is, step 336 sets the return code to accept the allocation, step 338 determines if the BUILD_TOP indicator record is set in any OSCT entry, step 340 builds an entry in MASTT 33 for the particular allocation if the BUILD_TOP record is set, and NCP 62 continues normal processing following step 340 or a negative result from step 338. If the result of step 326 is negative, step 328 checks the adapter description file for other choices that are supported for the region set in FIELD1. If such a choice is not found, step 330 branches to step 336. If such a choice is found, step 332 sets the return code to reject the allocation and repeat the process for the next choice by returning to NCP 62.

The manner in which a multi-cell MM 67 is built and used by BUILD_MM routine 66 is shown in FIGS. 7A–7I. Step 344 (FIG. 7A) first initializes MM 67 by setting all elements or cells to zeroes. MM 67 is a three index matrix having four planes with four rows and four columns in each plane. The matrix allows merging of all non-system memory region records into an array from which a selection is made for non-system memory allocations that will work for all operating system environments that coexist in DPS 10. The matrix eliminates the need for redundant records and provides for searching from the most restrictive to least restrictive environments. Each cell in MM 67 represents a memory region in which an operating system can support non-system memory allocations and the order in which device memory should be allocated.

Figure 7A:
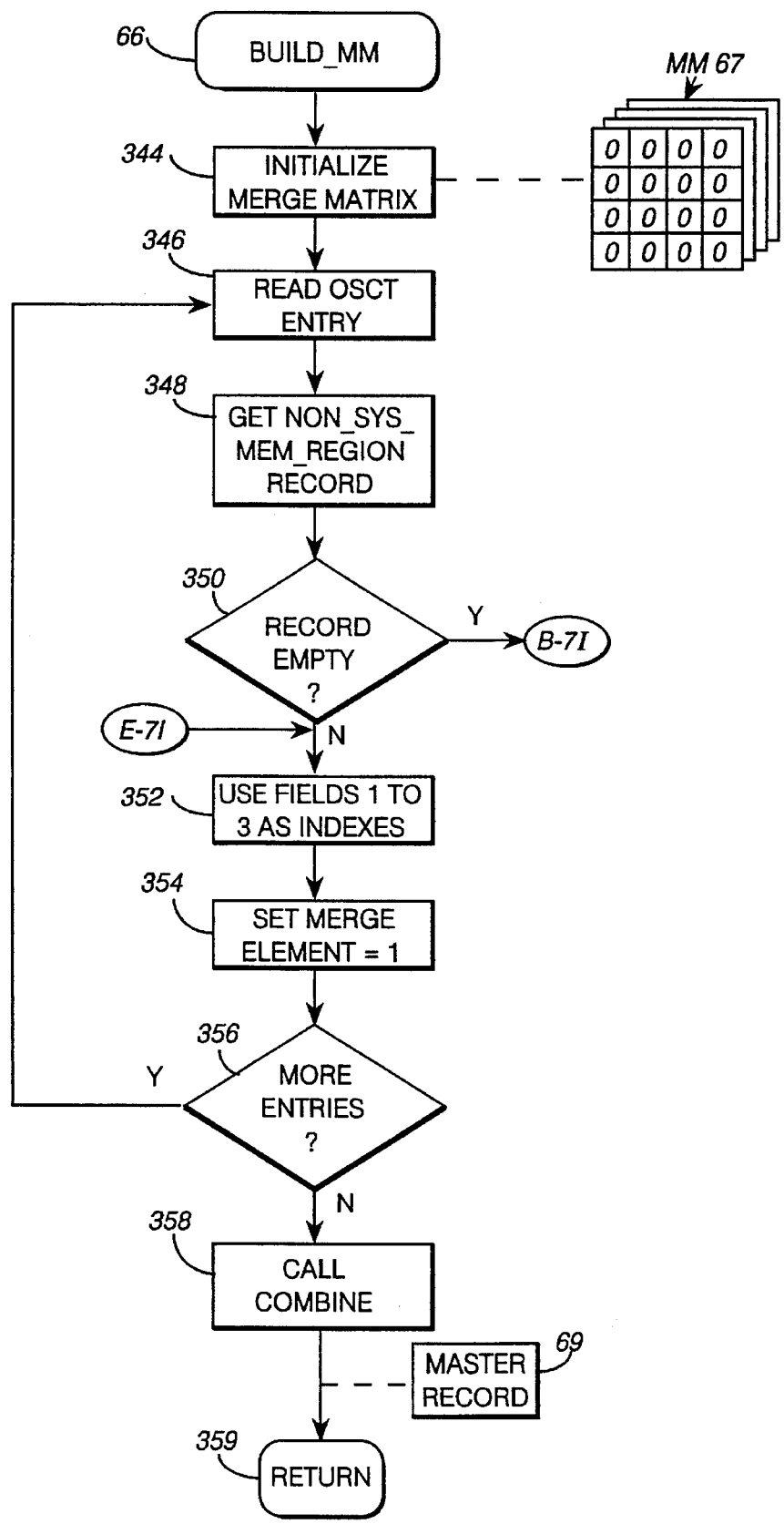
FIGS. 7A–7I are a flow chart of the Build_MM routine shown in FIG. 2.
Figure 7B:
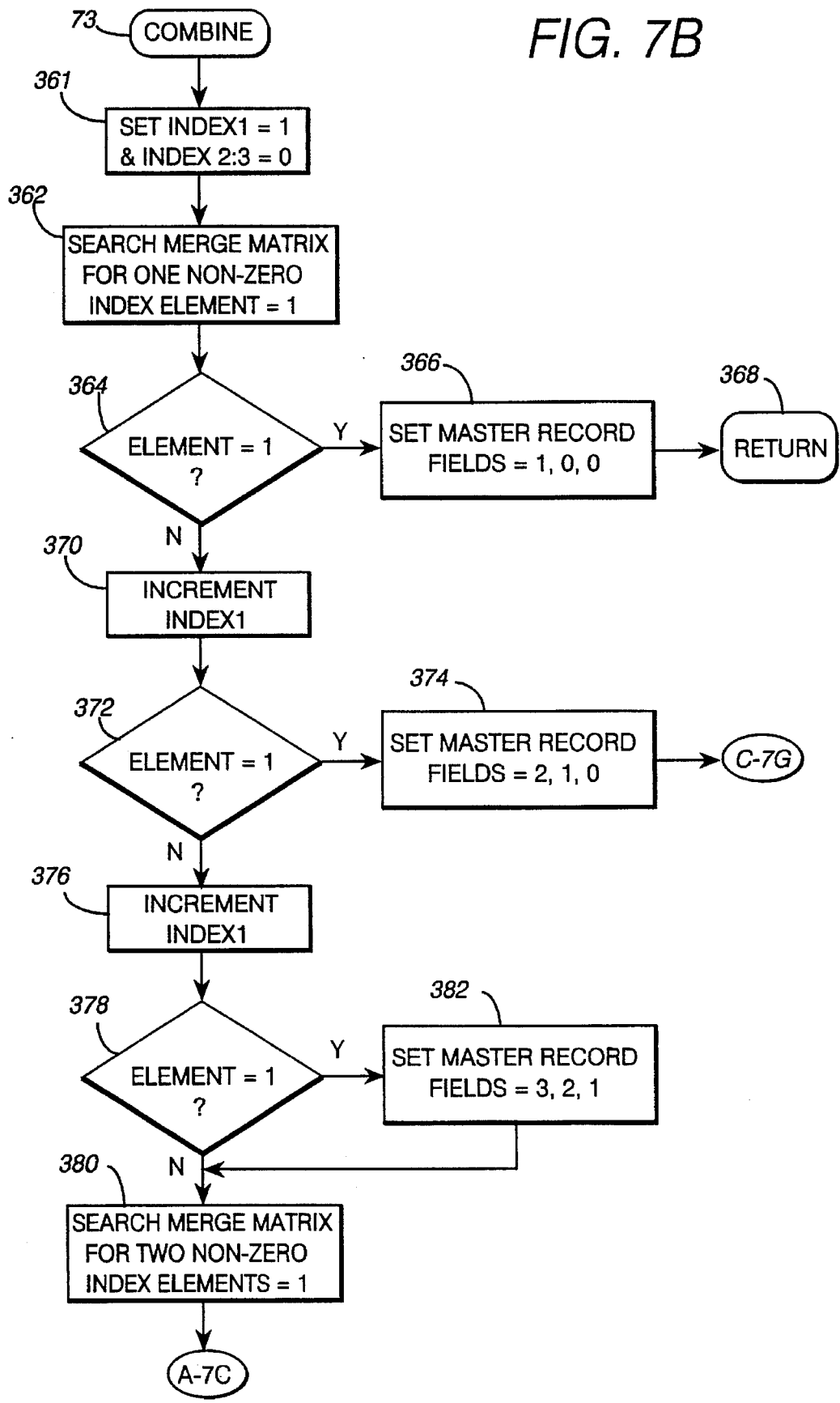
Figure 7C:
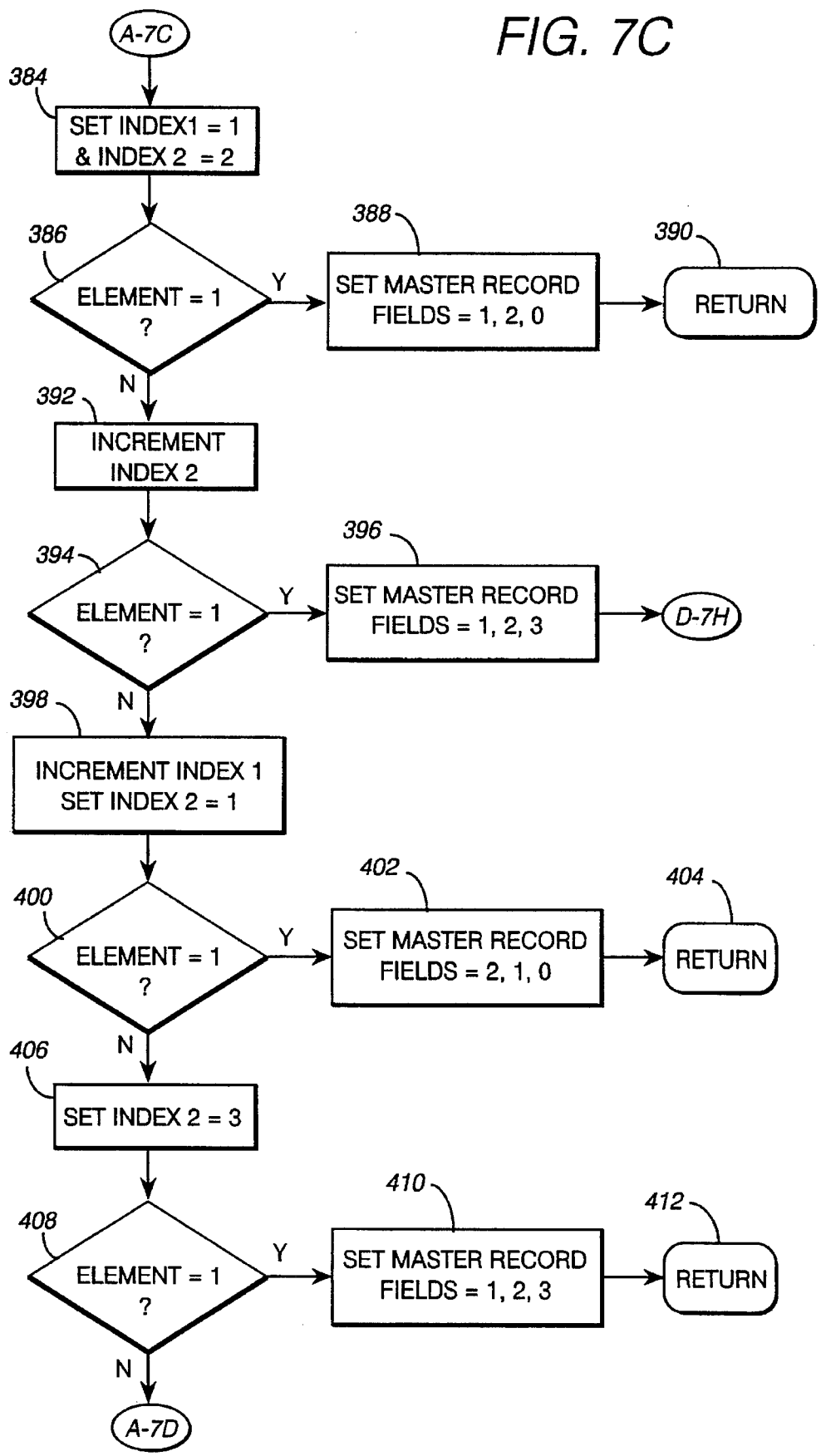
Figure 7D:
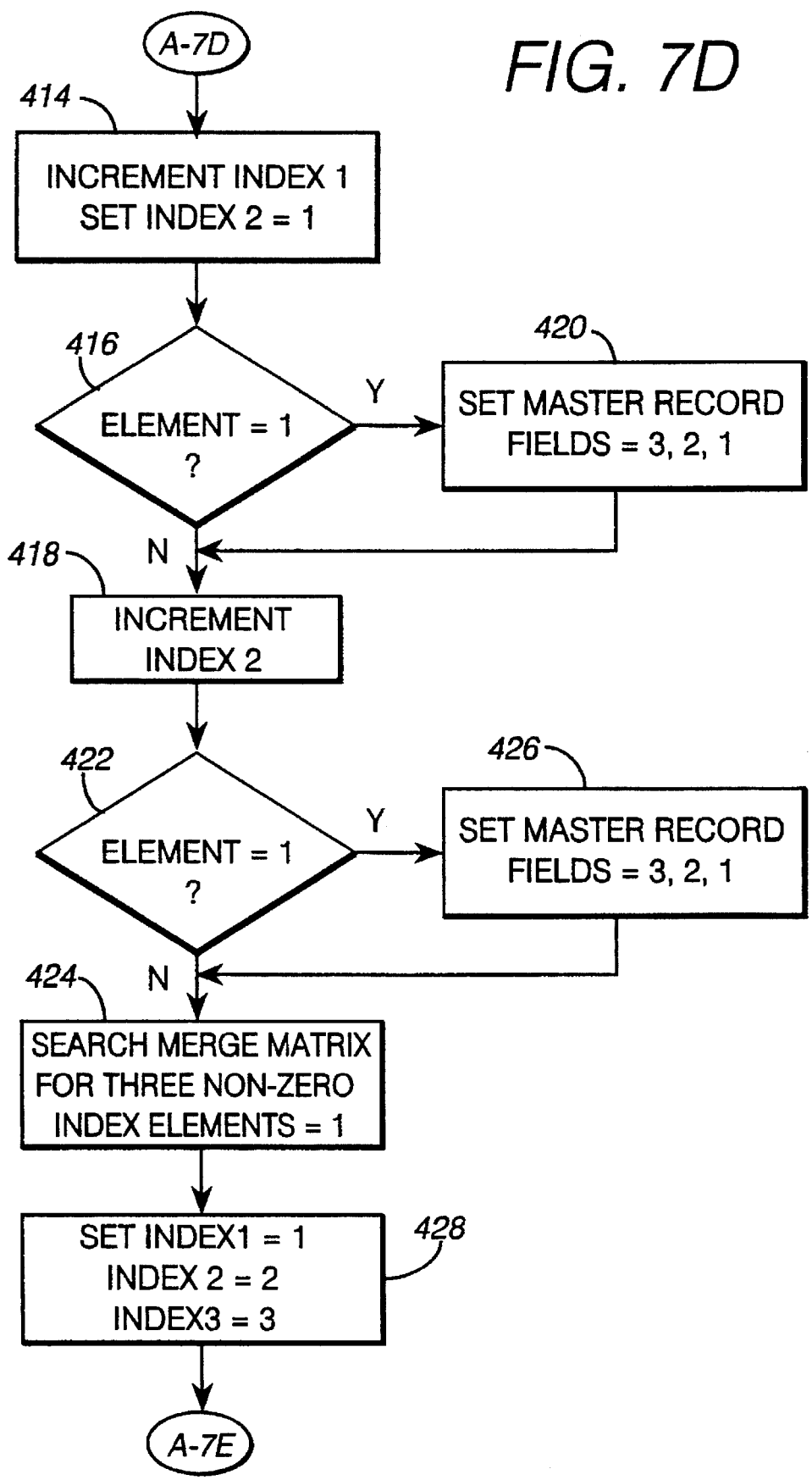

Step 346 reads an OSCT entry from OSCT 32 into main memory, the entry containing a plurality of records, as indicated above, for both system memory and non-system memory allocations. Step 348 gets a Non-Sys-Memory-Region record. Step 350 decides if the record is empty. If the record is empty, a branch is made to step 486 described below relative to FIG. 7I. If the record is not empty, or upon a return from the processing of FIG. 7I, step 352 sets up and uses fields 1–3 of the record as indexes INDEX1, INDEX2, and INDEX3 respectively into a row, column, and plane of MM 67. These three indexes thus access a particular element in the MM and step 354 sets the particular merge matrix element to "1". Step 356 decides if there is another OSCT entry. A positive decision by 356 results in a branch back to step 346 to read the next entry and repeat the process. When all entries have been processed, step 356 produces a negative result and step 358 then calls Combine routine 73 (FIG. 7B). Upon return from such routine, master record 69 has been created and a return 359 is made to memory allocation routine 64.

Combine routine 73 (FIG. 7B) begins with step 361 which sets INDEX1 to "1" and sets INDEX2 and INDEX3 to zeroes. Step 363 begins a search through the merge matrix for elements with only one non-zero index having a value of "1". Step 364 decides if the element is set to a "1". If so, step 366 sets the master record fields to "1, 0, 0" and a return 368 is made If the element is not a "1" step 370 increments INDEX1. Step 372 decides if the element is a one. If so, step 374 sets the master record to "2, 1, 0" and branches to step 470 (FIG. 7G). If step 372 produces a negative result, step 376 increments INDEX1 and step 378 checks for an element that is set to one. If one is found, step 382 sets the master record fields to "3, 2, 1". Next, step 380 begins searching the merge matrix for double elements with two non-zero indexes set to "1".

Step 384 (FIG. 7C) sets INDEX1=1 and INDEX2=2. Step 386 decides if the element is a "1". If so, step 388 sets the master record fields to "1, 2, 0" and a return 390 is made. If the element is not a "1" step 392 increments INDEX2 and a search is again made to locate an element set to "1". If such an element is found, thus producing a positive result from step 394, step 396 sets the master record to "1, 2, 3" and branches to step 478 (FIG. 7H). If step 394 produces a negative result, step 398 increments INDEX1 and sets INDEX2=1. Step 400 checks for an element that is set to one. If one is found, step 402 sets the master record fields to "2,1 0" and returns at 404 If step 400 produces a negative result, step 406 sets INDEX2=3. Step 408 checks for an element that is set to one. If one is found, step 410 sets the master record fields to "1, 2, 3" and returns at 412.

If step 408 produces a negative result, step 414 (FIG. 7D) increments INDEX1 and sets INDEX2=1. Step 416 checks for an element that is set to one. If one is found, step 420 sets the master record fields to "3, 2, 1". If step 416 produces a negative result or after step 420, step 418 increments INDEX2. Step 422 checks for an element that is set to one. If one is found, step 426 sets the master record fields to "3, 2, 1". Following either step 426 or a negative result from step 422, step 424 begins the search for elements with three non-zero indexes set to one. Step 428 sets INDEX1=1, INDEX2=2, and INDEX3=3.

Figure 7E:
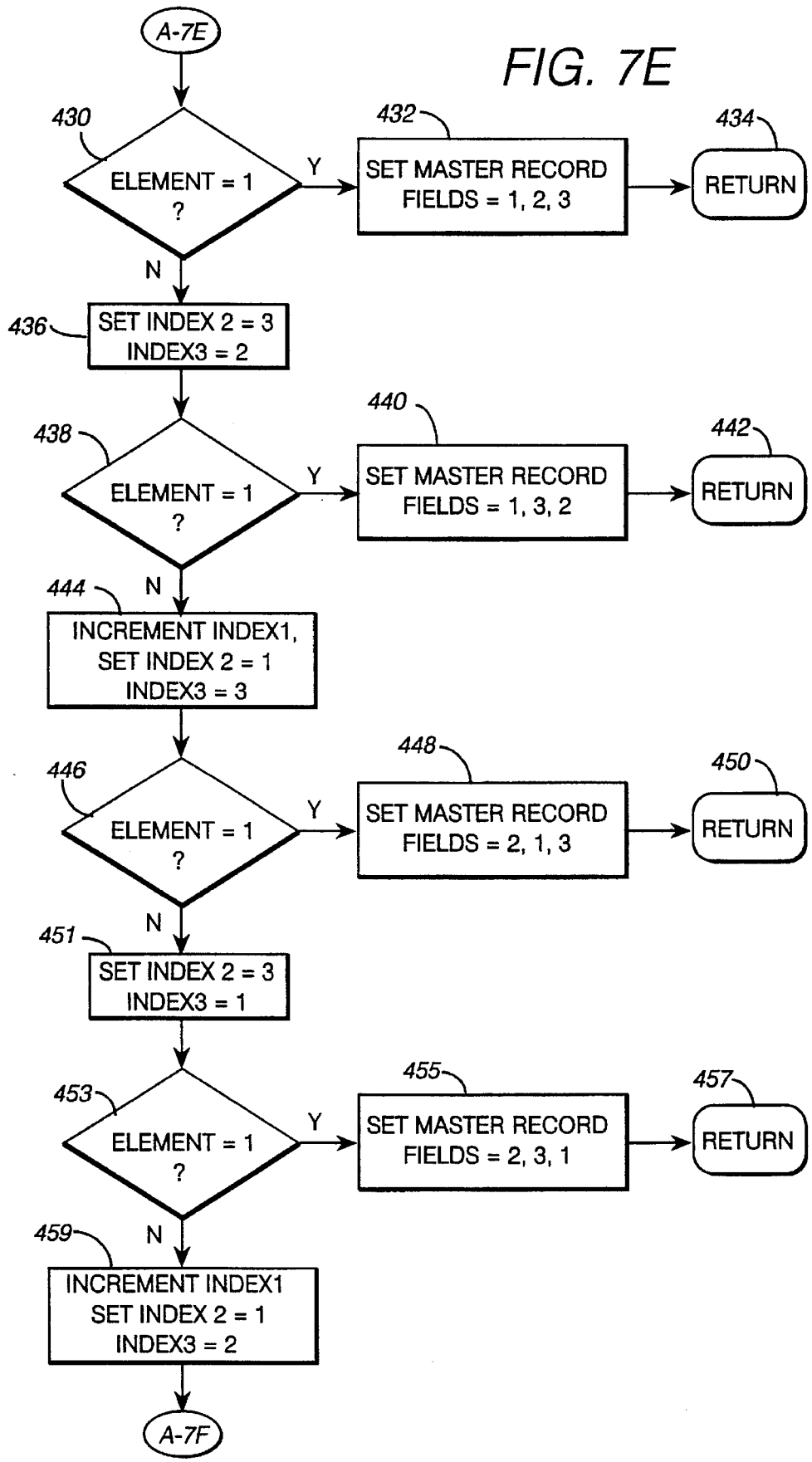
Figure 7F:
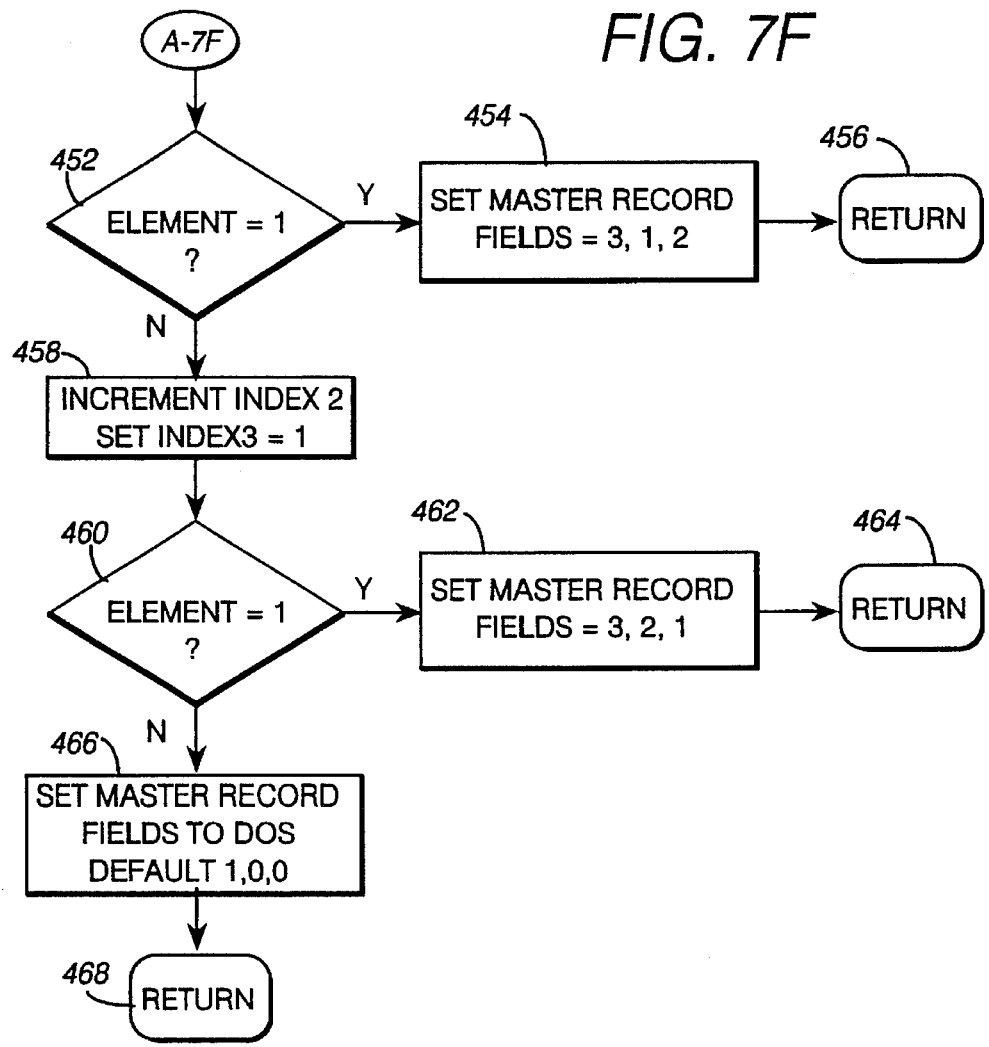
Figure 7G:
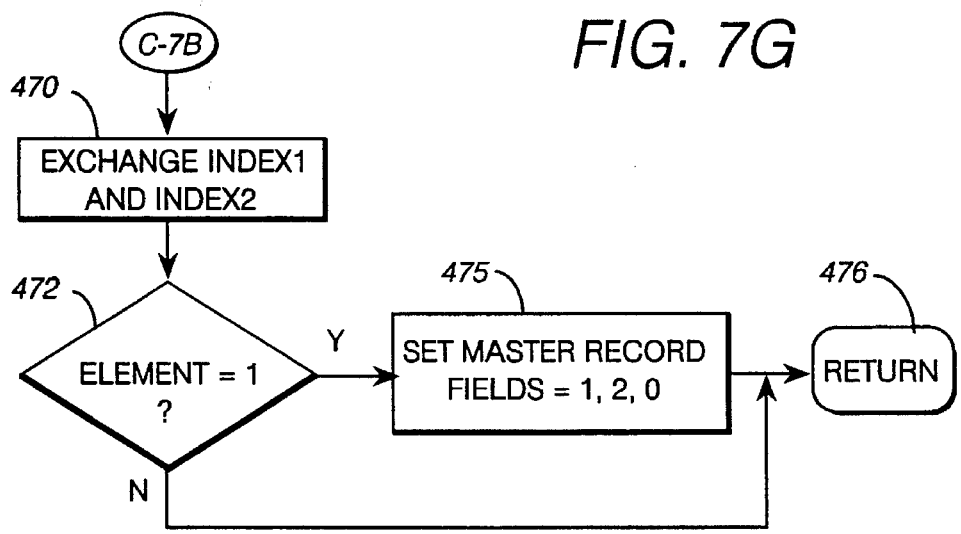
Figure 7H:
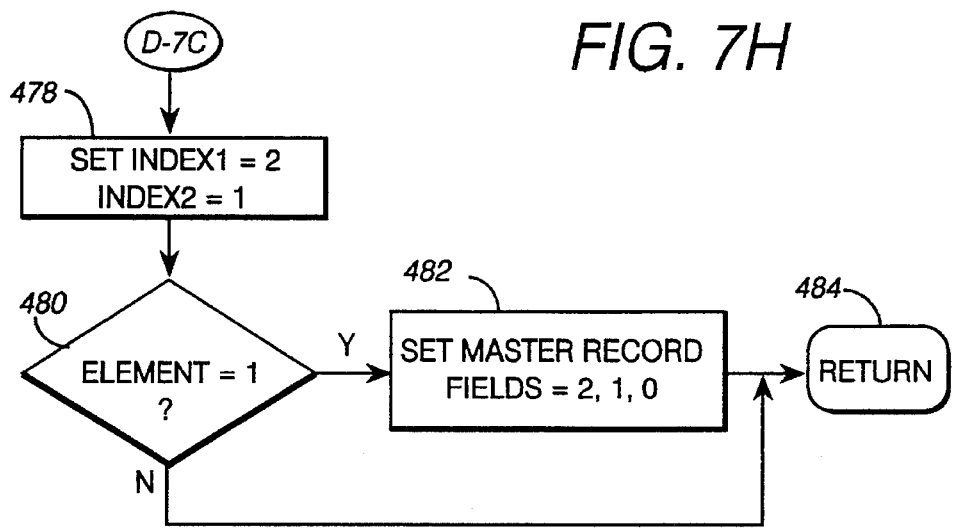

Then, referring to FIG. 7E, step 430 checks for an element that is set to one. If one is found, step 432 sets the master record fields to "1, 2, 3" and a return 434 is made. If step 430 produces a negative result, step 436 set INDEX2=3 and INDEX3=2. Step 438 checks for an element that is set to one. If one is found, step 440 sets the master record fields to "1, 3 2" and returns at 442 Following a negative result from step 438, step 444 increments INDEX1, sets INDEX2=1, and set INDEX3=3. Step 446 checks for an element that is set to one. If one is found, step 448 sets the master record fields to "2, 1, 3" and returns by 450. If step 446 produces a negative result, step 451 sets INDEX2=3 and INDEX3=1. Step 453 checks for an element that is set to one. If one is found, step 455 sets the master record fields to "2, 3, 1" and returns at 457. A negative result from step 443 causes step 459 to increment INDEX1 and set INDEX2=1 and INDEX3=2. Step 452 checks for an element that is set to one. If one is found, step 454 sets the master record fields to "3, 1, 2" and returns at 456. A negative result from step 452 causes step 458 to increment INDEX2 and set INDEX3=1. Step 460 checks for an element that is set to one. If one is found, step 462 sets the master record fields to "3, 2, 1" and returns at 464. A negative result from step 460 causes step 466 to set the master record fields to the DOS defaults of "1, 0, 0" and return to caller in step 468.

Referring to FIG. 7G, step 470, which follows step 374 (FIG. 7B), exchanges the contents of INDEX1 and INDEX2. Step 472 decides if the element is set to "1". If so, step 475 sets the master record fields to "1, 2, 0". A return 476 is made following step 475 or a negative result from step 472. Referring to FIG. 7H, step 478, which follows step 396 (FIG. 7C), sets INDEX1=2 and INDEX2=1. Step 480 decides if the element is set to "1". If so, step 482 sets the master record fields to "2, 1, 0". A return 484 is made following step 482 or a negative result from step 480.

Figure 7I:
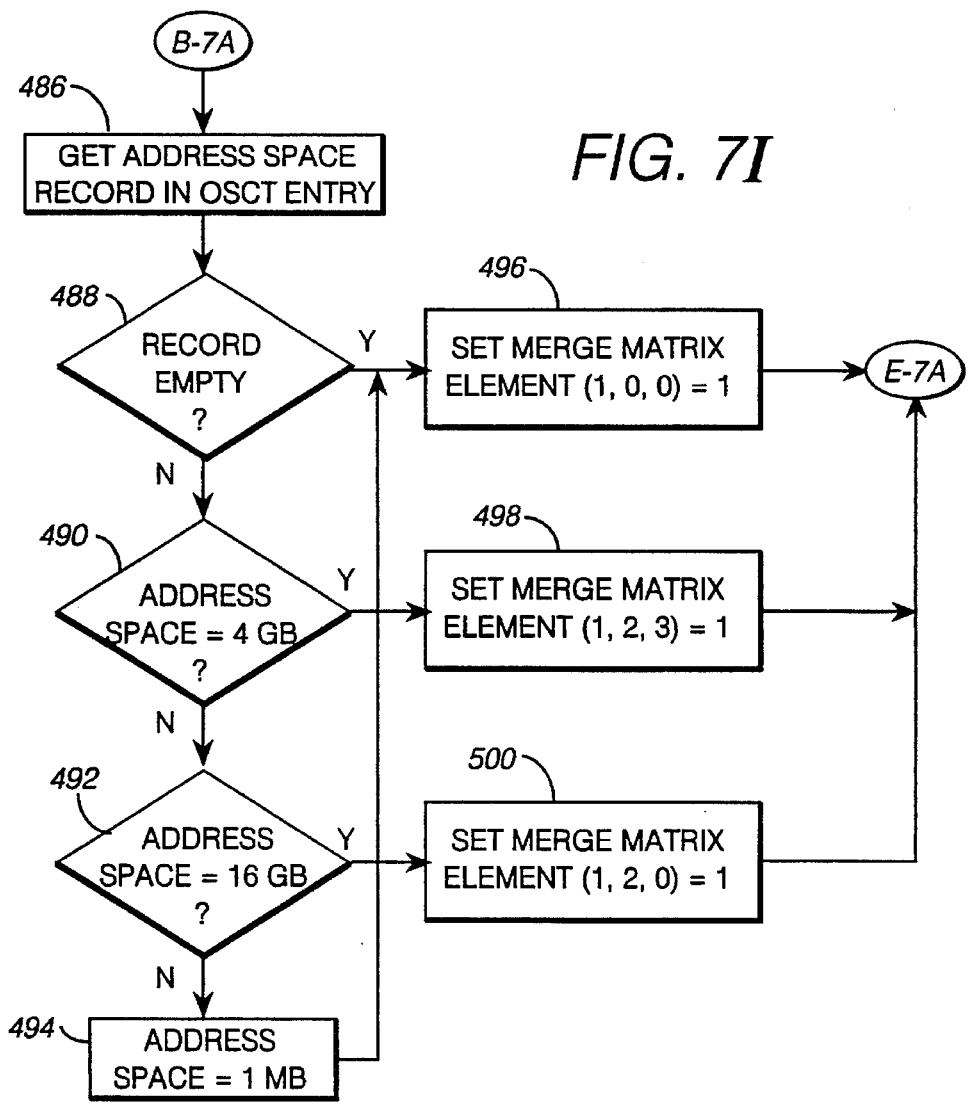

Referring to FIG. 7I, step 486, which follows a positive result from step 350 (FIG. 7A), gets the address space record from the OSCT entry. Steps 488, 490, and 492 respectively decide if the record is empty, set to 4GB, or set to 16GB. A positive result from steps 488, 490, or 492 respectively sets the merge matrix element (1,0,0)=1, (1,2,3)=1, or (1,2,0)=1. A negative result from step 494 causes step 494 to set the address space to 1MB and then jump to step 496. Following either of steps 496, 498, or 500, a jump is made to step 352 (FIG. 7A). The master record is used in steps 304 and 326.

Figure 8:
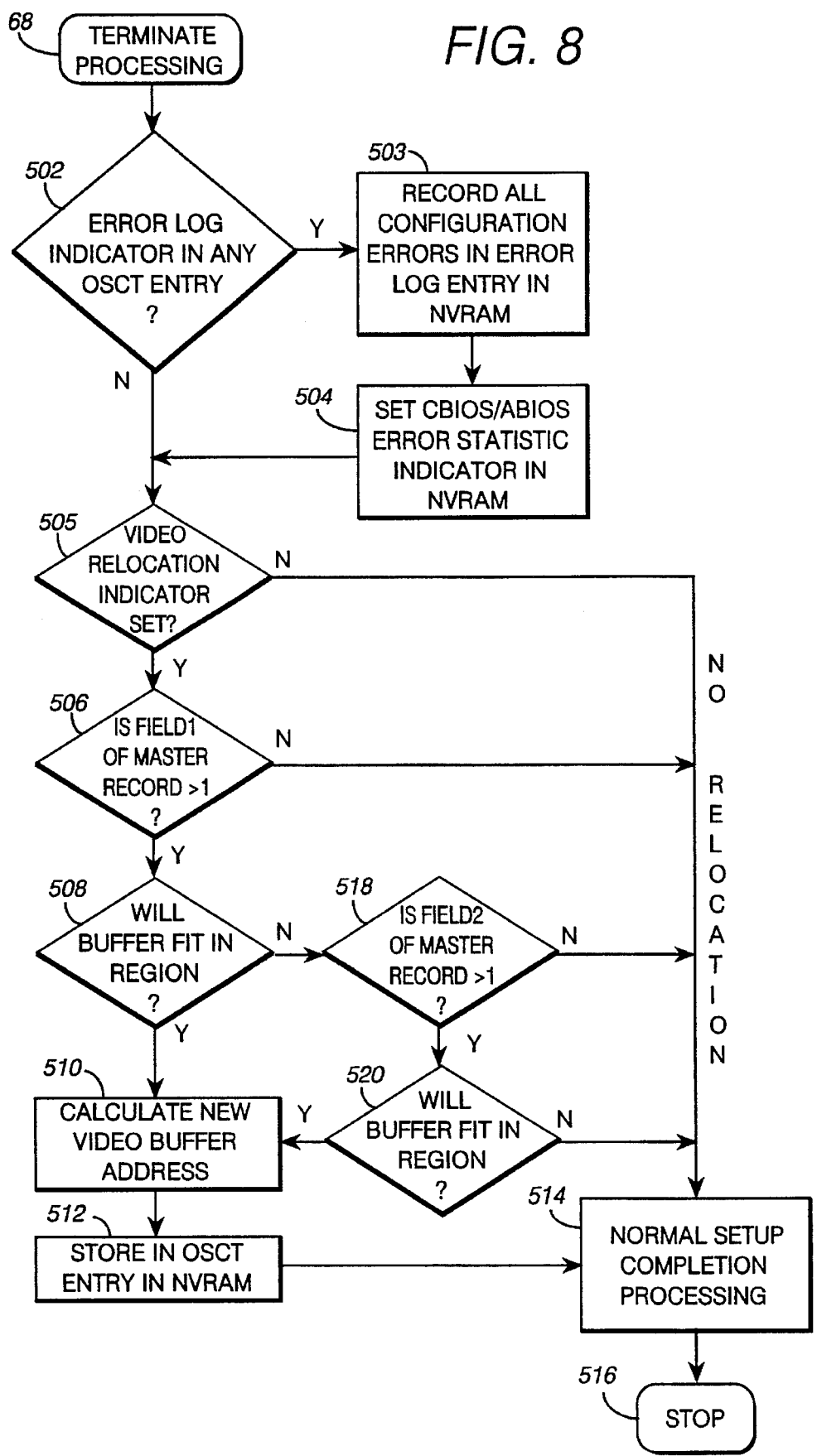
FIG. 8 is a flow chart of the Terminate Processing routine shown in FIG. 2.
Figure 9:
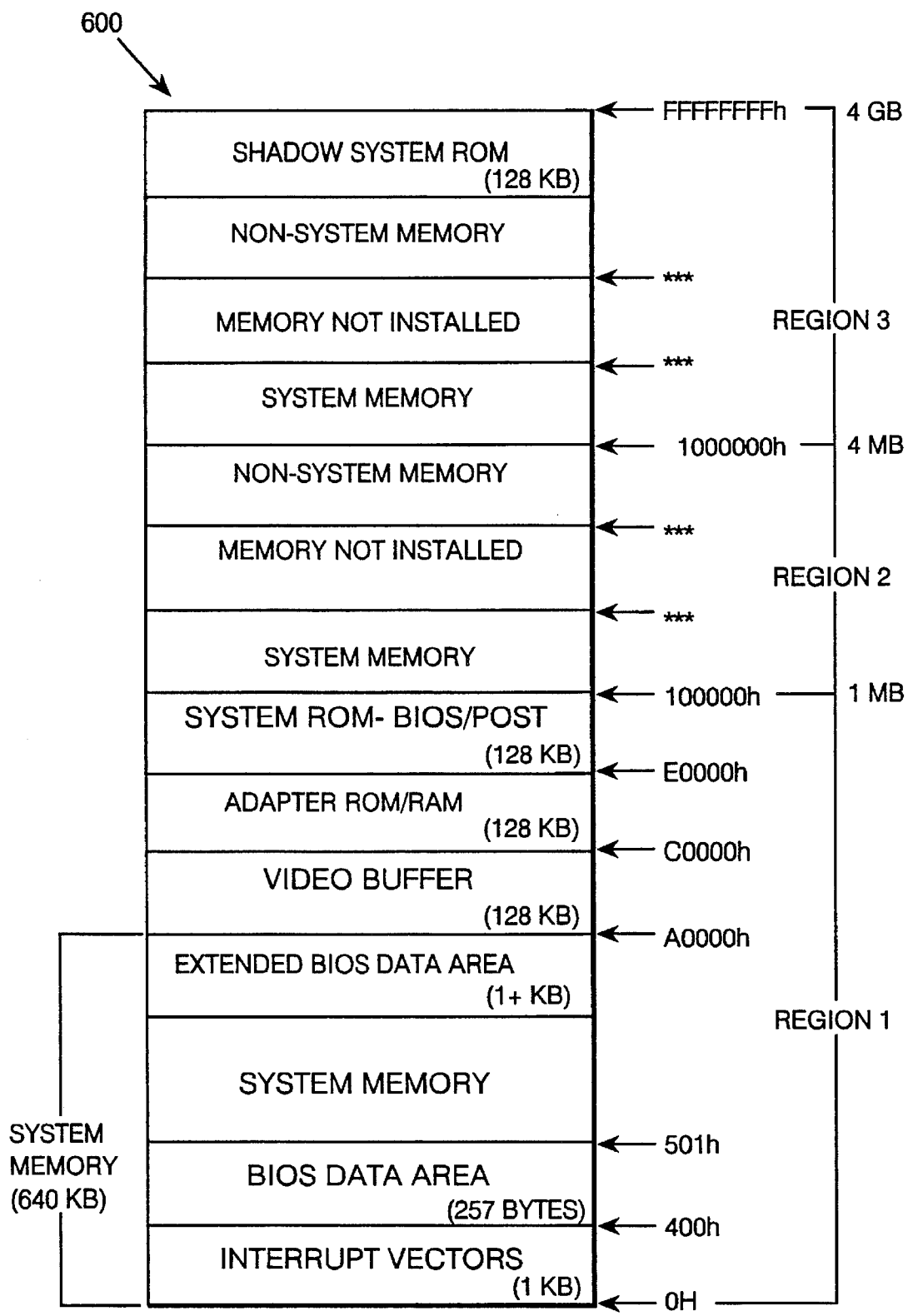
FIG. 9 is an illustration of a memory address space allocated in accordance with the prior art.

Referring to FIG. 8, terminate processing routine 68 is modified in accordance with the invention by the addition of several steps before step 514 which performs the normal setup completion processing before the SCP is ended with a STOP 516. Step 502 determines if there is an error log indicator set in any OSCT entry. If such indicator is set, step 503 records all of the configuration errors in an error log entry in NVRAM 30, and step 504 sets an CBIOS/ABIOS error statistic indicator in the NVRAM. Step 505 follows either of steps 502 or 504 and checks to see if the video relocation indicator is set. If the indicator is not set, no video relocation is performed and control passes to step 514 to complete processing and terminate the SCP.

If the video relocation indicator is set, step 506 decides if FIELD1 of the master record is greater than "1" (which indicates that the operating system supports allocations in regions 2 or 3). If it is not, indicating support for only the PC DOS environment, control passes to step 514. If step 506 produces a positive result, step 508 checks to see if the video buffer will fit in the address space region referenced or designated by the entry in FIELD1 of the master record. If so, step 510 calculates the new video buffer address and step 512 stores the address in the OSCT entry in the NVRAM before passing control to step 514. If step 508 produces a negative result, step 518 determines if FIELD2 of the master record is greater than "1". If so, step 520 then determines if the buffer will fit in the designated region and then passes control to step 510 when the buffer will fit. A negative decision from steps 518 and 520 causes step 514 to be processed to terminate the program.

As is obvious to those skilled in the art, the programs and data are stored as electrical signals. The term "processing means" as used in the claims encompasses not only the memories and storage devices which store and transmit the signals but also the different components, including the microprocessor, which operate in response to such signals, and perform the different processing functions and operations described above.

It should be apparent to those skilled in the art that many changes can be made in the details and arrangements of steps and parts without departing from the scope of the invention as defined in the appended claims.

What is claimed is:

1. A data processing system (DPS) comprising:

a processor having an addressable memory address space accessible by means of addresses having a number of address bits, which number defines the size of said memory address space;

said memory address space comprising a plurality of memory regions comprising a first memory region having an address range from 0 to (1 MB–1), a second memory region having an address range from 1 MB to (16 MB–1), and a third memory region having an address range from 16 MB to (4 GB–1);

non-volatile storage means for storing operating systems and operating system definition files (ODFs) which respectively defines customized operating environments supported by said operating systems;

a plurality of device adapters;

system memory located in said memory address space for storing one of said operating systems for execution by said processor, said one operating system owning and managing said system memory;

non-system memory located in said memory address space for storing adapter programs and data for interfacing with said device adapters;

said ODF containing a plurality of keywords which define said customized operating environment;

a non-volatile random access memory (NVRAM) for storing configuration information;

configuring means for assigning system resources and storing configuration information indicative of such assignment in said NVRAM, said configuring means comprising first means for generating proposed memory allocations; and ODF processing means for processing said ODFs, said ODF processing means comprising third means for storing information in said NVRAM which defines said customized operating environments and fourth means for analyzing said proposed memory allocations and either accepting or rejecting each proposed allocation in accordance with said customized operating environments.

2. A DPS in accordance with claim 1 wherein said third means comprises fifth means for storing an operating system configuration table (OSCT) in said NVRAM, said OSCT having an OSCT entry for each operating environment, each OSCT entry having a plurality of OSCT records respectively containing information derived from said keywords.

3. A DPS in accordance with claim 2 wherein:

said third means comprises sixth means for reading each keyword into said system memory and a plurality of keyword processors for respectively processing said keywords, each keyword processor being operative to process a different one of said keywords and place information from such keyword in an OSCT record.

4. A DPS in accordance with claim 3 wherein:

one of said ODFs contains a Non_Sys_Mem_Region keyword having a plurality of parameters indicating in which memory regions said operating system can accept non-system memory allocations;

one of said keyword processors is operative to place said parameters in a Non_Sys_Mem_Region OSCT record for storage in said OSCT; and said fourth means comprises means responsive to a proposed memory allocation of non-system memory for analyzing all Non_Sys_Mem_Region OSCT records stored in said OSCT and accepting such proposed memory allocation when it is in a region supported by all of said operating systems.

5. A DPS in accordance with claim 3 wherein one of said ODFs contains a Skip_Region keyword having a parameter that specifies a memory region to be skipped from having system memory assigned thereto;

one of said keyword processors is operative to place said parameter in a Skip_Region OSCT record for storage in said OSCT; and said fourth means is operative to reject a proposed allocation of system memory to said memory region specified by said parameter and to accept a proposed allocation of system memory to a memory region other than said memory region specified by said parameter.

6. A DPS in accordance with claim 3 wherein:

one of said ODFs contains an Address_Space keyword having an Address_Space parameter indicating size of the memory address space supported in said operating environment; and one of said keyword processors is operative to place said Address_Space parameter in an Address_Space OSCT record for storage in said OSCT.

7. A DPS in accordance with claim 3 wherein:

one of said ODFs contains a Relocate_Video keyword having Relocate_Video parameters for indicating a memory region to which a video buffer is to be relocated to from said first memory region and for indicating the length of such video buffer;

one of said keyword processors is operative to place said Relocate_Video parameters in a Relocate_Video OSCT record for storage in said OSCT and to set a Relocate_Video indicator in said OSCT; and said DPS further comprises seventh means responsive to said Relocate_Video indicator for calculating an address for said video buffer in said region to which said buffer is to be relocated.

8. A DPS in accordance with claim 3 wherein:

one of said ODFs contains keywords for a plurality of operating environments, said keyword for each operating environment being delineated by a Begin_OS keyword indicating the start of an operating environment and an End_OS keyword indicating the end of an operating environment; and said fifth means is operative to store an OSCT entry for an operating environment described by all keywords between said Begin—OS and said End_OS keywords.

9. A DPS in accordance with claim 3 wherein:

one of said ODFs contains a Build_TOP keyword;

one of said keyword processors is operative to set a Build_TOP indicator in a Build_TOP OSCT record for storage in said OSCT; and said ODF processing means includes eighth means for accessing said OSCT record and storing in said NVRAM, in response to a set Build_TOP indicator in said Build_TOP OSCT record, a memory address space topology table (MASTT) having an entry for each memory allocation; each entry in said MASTT including start address, end address, memory type (system memory, non-system memory), cache attribute (cached, non-cached), and location (planar, non-planar).

10. A DPS in accordance with claim 3 wherein:

one of said ODFs contains a Share_Int keyword having a plurality of Share_Int parameters indicating interrupt levels that can be shared;

one of said keyword processors is operative to place said Share_Int parameters in a Share_Int OSCT record for storage in said OSCT;

ninth means for allocating interrupt levels and determining if any conflict exists between interrupt level allocations; and tenth means operative in response to said ninth means determining that a conflict exists to FIG. 5b, functional statement of when accepted and when device disabled.

11. A DPS in accordance with claim 3 wherein:

one of said ODFs contains a No_Init_Prog keyword indicating that said operating system does not want initialization programs or data installed in a predetermined location; and one of said keyword processors is operative to set a No_Init_Prog indicator in a No_Init_Prog OSCT record for storage in said OSCT.

12. A DPS in accordance with claim 3 wherein:

one of said ODFs contains an OS_Name keyword having a parameter for the name of said operating system; and one of said keyword processors is operative to place said name of said operating system in a OS_Name OSCT record for storage in said OSCT.

13. A DPS in accordance with claim 3 wherein:

one of said ODFs contains a Page keyword indicating said operating environment uses demand paging; and one of said keyword processors is operative to set a Page indicator in a Page OSCT record for storage in said OSCT.

14. A DPS in accordance with claim 3 wherein:

one of said ODFs contains an Error_log keyword indicating that said operating system performs error logging; and one of said keyword processors is operative to set a Error_log indicator in a Error_log OSCT record for storage in said OSCT.

15. A DPS in accordance with claim 3 wherein:

one of said ODFs contains an OS_Conf keyword for stopping said configuring means thereby allowing said operating system to perform all configuration operations; and one of said keyword processors is operative to stop said configuring means in response to detecting said OS_Conf keyword.

16. A data processing system (DPS) comprising:

a processor having an addressable memory address space accessible by means of addresses having a number of address bits, which number defines the size of said memory address space;

said memory address space comprising a plurality of memory regions comprising a first memory region having an address range from 0 to (1 MB−1), a second memory region having an address range from 1 MB to (4 MB−1), and a third memory region having an address range from 16 MB to (4 GB−1);

a plurality of device adapters;

non-volatile storage means for storing a plurality of adapter description files (ADFs) respectively related to said device adapters and containing device adapter specific information including a plurality of choices identifying non-system memory resources needed by the related device adapter, a plurality of operating systems, and a plurality of operating system definition file (ODFs) which define customized operating environments supported by said operating systems;

said ODFs containing a plurality of keywords which define a different one of said customized operating environments, said keywords comprising an OS_Name keyword containing a name of one of said operating systems and a Non_Sys_Mem_Region keyword containing a list of memory regions supported by said one operating system;

system memory located in said memory address space for storing one of said operating systems for execution by said processor;

non-system memory located in said memory address space for storing device adapter programs and data;

a non-volatile random access memory (NVRAM) comprising an operating system configuration table (OSCT);

configuring means for assigning system resources and storing configuration information indicative of such assignment in said NVRAM, said configuring means comprising first means for reading said ADFs and generating for each device adapter a proposed memory allocation derived from one or said choices in said related ADF, said proposed memory allocation indicating a memory space address for such allocation and an indication of whether the allocation is for system memory or non-system memory; and ODF processing means for processing said ODFs, said ODF processing means comprising
third means for reading said ODFs and storing operating environment information in said OSCT,
and fourth means for analyzing said proposed memory allocations and either accepting or rejecting each proposed allocation in accordance with said operating environment information stored in said OSCT.

17. A DPS in accordance with claim 16 wherein said fourth means comprises:

fifth means for generating a master record having a plurality of fields of regions supporting all of said operating environments;

sixth means for determining from said memory space address in said proposed memory allocation whether such address is within one of said regions in said master record; and seventh means for disabling the one of said device adapters for which the proposed memory allocation was made, when such address is outside of any region in said master record.

18. A DPS in accordance with claim 17 wherein said fourth means further comprises:

eighth means operative when said address in said proposed memory allocation is in a region set forth in a predetermined field of said master record, for setting a return code indicating acceptance of said proposed memory allocation.

19. A DPS in accordance with claim 18 wherein said fourth means further comprises:

ninth means operative, when said address in said proposed memory allocation is outside of said region set forth in a predetermined field of said master record, for setting said return code indicating rejection of said proposed memory allocation.

20. A DPS in accordance with claim 19 wherein said configuring means comprises tenth means responsive to said return code for generating another proposed memory allocation from another one of said choices when said return code indicates rejection and assigning said proposed allocation when said return code indicates acceptance.

21. A DPS in accordance with claim 17 wherein said fourth means further comprises:

eleventh means operative when said address in said proposed memory allocation is not in said region set forth in said predetermined field of said master record, for setting a return code indicating acceptance of said proposed memory allocation when said address is within a region contained in a different one of said choices in an ADF.

22. A DPS in accordance with claim 17 wherein:

said third means stores in said OSCT a plurality of lists from said Non_Sys_Mem_Region keywords said fifth means comprises twelfth means for analyzing all of said lists in said OSCT and generating said master record in response thereto.

\* \* \* \* \*